US012168230B2

(12) United States Patent
Nisisako et al.

(10) Patent No.: US 12,168,230 B2
(45) Date of Patent: Dec. 17, 2024

(54) MICRODROPLET/BUBBLE-PRODUCING DEVICE

(71) Applicant: JAPAN SCIENCE AND TECHNOLOGY AGENCY, Kawaguchi (JP)

(72) Inventors: Takasi Nisisako, Tokyo (JP); Naotomo Tottori, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 1148 days.

(21) Appl. No.: 16/976,384

(22) PCT Filed: Feb. 28, 2019

(86) PCT No.: PCT/JP2019/007953
§ 371 (c)(1),
(2) Date: Aug. 27, 2020

(87) PCT Pub. No.: WO2019/168130
PCT Pub. Date: Sep. 6, 2019

(65) Prior Publication Data
US 2021/0001340 A1 Jan. 7, 2021

(30) Foreign Application Priority Data
Feb. 28, 2018 (JP) ................................. 2018-036014

(51) Int. Cl.
*B01L 3/00* (2006.01)
*B01F 23/231* (2022.01)
(Continued)

(52) U.S. Cl.
CPC .. *B01L 3/502784* (2013.01); *B01F 23/23105* (2022.01); *B01F 23/2373* (2022.01);
(Continued)

(58) Field of Classification Search
CPC ........... B01L 3/502784; B01L 2200/12; B01L 2300/0809; B01L 2300/0861;
(Continued)

(56) References Cited

U.S. PATENT DOCUMENTS

| 2006/0087917 | A1 | 4/2006 | Ehrfeld et al. |
| 2012/0213686 | A1* | 8/2012 | Katayama ............ B01J 19/0093 423/339 |
| 2013/0129581 | A1* | 5/2013 | Nisisako ........... B01F 35/71755 422/502 |

FOREIGN PATENT DOCUMENTS

| JP | 3694876 B | 9/2005 |
| JP | 2006-508795 A | 3/2006 |

(Continued)

OTHER PUBLICATIONS

Conchouso et al., "Three-dimensional parallelization of microfluidic droplet generators for a litre per hour volume production of single emulsions," Lab on a Chip, 2014, 14:3011-3020.
(Continued)

*Primary Examiner* — Jennifer Wecker
*Assistant Examiner* — Ali Husain Faraz
(74) *Attorney, Agent, or Firm* — Foley & Lardner LLP

(57) ABSTRACT

The invention provides a microdroplet- or bubble-producing device that does not require separate through-holes for different liquid droplet/air bubble-producing flow channels. The droplet-producing flow channels are configured in a three-dimensional manner unlike in a conventional device where they are configured in a two-dimensional plane, and therefore the flow channels can be provided in a more high-density configuration than the prior art. In the microdroplet/bubble-producing device comprising slit(s) and the row of the plurality of microflow channels, the slit(s) is/are a continuous phase supply slit, a dispersion phase supply slit and a discharge slit, the plurality of microflow channels are
(Continued)

configured so that the ends of the slit(s) and the two supply ports on both sides or the supply port and discharge port on either side are mutually connected, and at the sites of connection between the microflow channels and the slit(s), the dispersion phase undergoes shear with the continuous phase flow as the driving force, producing droplets or air bubbles of the dispersion phase, which are recovered from the discharge port.

30 Claims, 21 Drawing Sheets

(51) Int. Cl.
  *B01F 23/2373* (2022.01)
  *B01F 23/41* (2022.01)
  *B01F 25/441* (2022.01)
  *B01F 33/3012* (2022.01)

(52) U.S. Cl.
  CPC ........ *B01F 23/41* (2022.01); *B01F 25/44121* (2022.01); *B01F 25/4413* (2022.01); *B01F 33/3012* (2022.01); *B01F 33/30121* (2022.01); *B01F 23/4143* (2022.01); *B01F 2215/0431* (2013.01); *B01L 2200/12* (2013.01); *B01L 2300/0809* (2013.01); *B01L 2300/0861* (2013.01); *B01L 2300/161* (2013.01)

(58) Field of Classification Search
  CPC .......... B01L 2300/161; B01F 23/23105; B01F 23/2373; B01F 23/41; B01F 25/44121; B01F 25/4413; B01F 33/3012; B01F 33/30121; B01F 23/4143; B01F 2215/0431; B01F 23/2323; B01F 25/31432; B01F 33/30; B01F 33/813; B01F 35/561; B01J 2204/002; B01J 4/004; B01J 2208/00911; B01J 10/002
  See application file for complete search history.

(56) References Cited

FOREIGN PATENT DOCUMENTS

| JP | 2006-110505 A | 4/2006 |
| JP | 2008-168175 | 7/2008 |
| WO | WO-2011/059069 A1 | 5/2011 |
| WO | WO-2012/008497 A1 | 1/2012 |

OTHER PUBLICATIONS

Jeong et al., "Kilo-scale droplet generation in three-dimensional monolithic elastomer device (3D MED)," Lab on a Chip, 2015, 15:4387-4392.

Jeong et al., "Liter-scale production of uniform gas bubbles via parallelization of slow-focusing generators," Lab on a Chip, 2017, 17:2667-2673.

Jeong et al., "Recent developments in scale-up of microfluidic emulsion generation via parallelization," Korean J. Chem. Eng., 2016, 33(6):1757-1766.

Li et al., "Multiple modular microfluidic (M3) reactors for the synthesis of polymer particles," Lab on a Chip, 2009, 9:2715-2721.

Nisisako et al,. "High-volume production of single and compound emulsions in a microfluidic parallelization arrangement coupled with coaxial annular world-to-chip interfaces," Lab Chip, 2012, 12:3426-3435.

Nisisako et al., "Microfluidic large-scale integration on a chip for mass production of monodisperse droplets and particles," Lab Chip, 2008, 8:287-293.

Nisisako et al., "Recent advances in microfluidic production of Janus droplets and particles," Current Opinion in Colloid & Interface Science, 2016, 25:1-12.

Romanowsky et al., "High throughput production of single core double emulsions in a parallelized microfluidic device," Lab Chip, 2012, 12:802-807.

Tetradis-Meris et al., "Novel Parallel Integration of Microfluidic Device Network for Emulsion Formation," Ind. Eng. Chem., Res., 2009, 48:8881-8889.

* cited by examiner

MICRODROPLET/BUBBLE-PRODUCING DEVICE

CROSS-REFERENCE TO RELATED APPLICATIONS

This application is the U.S. National Stage of PCT/JP2019/007953, filed Feb. 28, 2019, which claims priority to JP 2018-036014, filed Feb. 28, 2018.

FIELD

The present invention relates to a microdroplet/bubble-producing device using a microflow channel.

BACKGROUND

Methods for producing microdroplets and air bubbles using the branched structures of microflow channels allow formation of emulsion droplets and air bubbles with excellent monodispersity, and they are therefore employed in a variety of fields including chemical/biochemical analysis. When such a method is employed as a production technique, however, it is difficult to achieve the required production volume of several tons per year, for example, using a single microflow channel (NPLs 1 and 2).

Such being the case, it has been attempted to provide multiple microflow channels in parallel to achieve a drastic increase in production volume of droplets or air bubbles (scaling-up) (NPLs 3 and 4). When producing microdroplets and air bubbles using branched structures of microflow channels, the produced droplets or air bubbles vary in size by the flow rates of the dispersion phase and continuous phase, and therefore formation of droplets or air bubbles of homogeneous size requires an evenly distributed supply of the dispersion phase and continuous phase in the parallel microflow channels. In a conventional paralleled device, equal flow distributions are formed in different microdroplet/bubble-producing flow channels by a construction in which symmetrically branched distributing flow channels are connected for each producing flow channel (NPLs 3 to 5), or a construction in which flow channels that are sufficiently large for the sizes of the producing flow channels are connected in a ladder-like fashion (NPLs 5 to 7). As reported in the past, distributed flow channels with a symmetrically branched structure have been used to form a maximum of 512 cross-shaped droplet-producing flow channels paralleled in a circular fashion (NPL 8), and ladder-like liquid distributing flow channels have been used to form a maximum of 1000 droplet-producing flow channels paralleled in a matrix fashion (NPL 9). Mass production of air bubbles using a similar apparatus has also been reported (NPL 10). There have also been proposed devices with removable liquid supply flow channels and droplet-producing flow channels (NPLs 2 and 3).

However, the conventional paralleled devices require complex device fabrication steps in order to create separate through-holes corresponding to liquid droplet/air bubble-producing flow channels, for connection between the liquid- or gas-distributing flow channels and the liquid droplet/air bubble-producing flow channels.

CITATION LIST

Non-Patent Literature

[NPL 1] T. Nisisako et al., Lab Chip, 8, 287-293, 2008.
[NPL 2] T. Nisisako et al., Lab Chip, 12, 3426-3435, 2012.
[NPL 3] T. Nisisako et al., Curr. Opin. Colloid Interface Sci., 25, 1-12, 2016.
[NPL 4] H.-H. Jeong et al., Korean J. Chem. Eng. 33, 1757-1766, 2016.
[NPL 5] G. T. Meris et al., Ind. Eng. Chem. Res. 48, 8881-8889, 2009.
[NPL 6] W. Li et al., Lab Chip, 9, 2715-2721, 2009.
[NPL 7] M. B. Romanowsky et al., Lab Chip, 12, 802-807, 2012.
[NPL 8] D. Conchouso et al., Lab Chip, 14, 3011-3020, 2014.
[NPL 9] H.-H. Jeong et al., Lab Chip, 15, 4387-4392, 2015.
[NPL 10] H.-H. Jeong et al., Lab Chip, 17, 2667-2673, 2017.

SUMMARY

Technical Problem

The present invention solves the aforementioned problem by providing a microdroplet/bubble-producing device that does not require separate through-holes for different liquid droplet/air bubble-producing flow channels. The present invention provides a microdroplet/bubble-producing device which, instead of having droplet/air bubble-producing flow channels configured in a two-dimensional plane as in a conventional device, has a simple construction where slits and a microflow channel array are combined in a three-dimensional manner, allowing easier mounting and management than in the prior art, and having the microdroplet/air bubble-forming units configured in a highly dense manner.

Solution to Problem

In order to achieve this object, the invention provides the following inventions and aspects.

(Aspect 1)

A microdroplet/bubble-producing device provided with slit(s) (3, 4, 5) and a row of a plurality of microflow channels (9), and constructed so that:
- the slit(s) (3, 4, 5) is/are one or more of a continuous phase supply slit (4), a dispersion phase supply slit (3) and a discharge slit (5),
- at least one of the slit(s) (3, 4, 5) is sandwiched between any two from among a dispersion phase supply port (6), a continuous phase supply port (7) and a discharge port (8),
- the plurality of microflow channels (9) are disposed at the face perpendicular to the sandwiched slit(s), which is present at the end of the sandwiched slit(s), so as to connect the end of the sandwiched slit(s) with two supply ports on both sides or with a supply port and a discharge port,
- a dispersion phase (1) is supplied from a dispersion phase supply port (6) while a continuous phase (2) is supplied from a continuous phase supply port (7),
- either or both the dispersion phase (1) and continuous phase (2) are distributed in the plurality of microflow channels (9), and
- at the sites of connection between the sandwiched slit(s) and the microflow channels, flow of the continuous phase (2) is sheared by the dispersion phase (1) as the driving force, forming droplets or air bubbles of the dispersion phase (1), and the product is recovered from the discharge port.

(Aspect 2)

The microdroplet/bubble-producing device according to aspect 1, wherein all of the ends of the dispersion phase supply port (6), continuous phase supply port (7) and discharge port (8) that are joints with the plurality of microflow channels are slit-shaped.
(Aspect 3)

The microdroplet/bubble-producing device according to aspect 1 or 2, wherein the slits (3, 4, 5) are tabular slits.
(Aspect 4)

The microdroplet/bubble-producing device according to aspect 1 or 2, wherein the slits (3, 4, 5) are annular slit(s).
(Aspect 5)

The microdroplet/bubble-producing device according to aspect 3 or 4, which is constructed by aligning together a part (20, 22, 24) comprising a plurality of slits and a flat part (10, 12, 14) formed with a row of a plurality of microgrooves on the surface, and attaching the face of the ends of the plurality of slits and the face of the flat part that is formed with the microgrooves.
(Aspect 6)

The microdroplet/bubble-producing device according to aspect 3 or 4, wherein a row of a plurality of microgrooves (11-1, 13-1) is formed on the surface of a part comprising a plurality of slits (21, 23), and the microgrooves (11-1, 13-1) are sealed with a separate flat part (11, 13), forming the row of the plurality of microflow channels.
(Aspect 7)

The microdroplet/bubble-producing device according to aspect 5 or 6, wherein the microflow channels (9) have widths of 1 to 200 μm and heights of 1 to 200 μm.
(Aspect 8)

The microdroplet/bubble-producing device according to aspect 5 or 6, wherein the width(s) of the end(s) of the slit(s) (3, 4, 5) is/are 10 to 500 μm.
(Aspect 9)

The microbubble-producing device according to aspect 7 or 8, wherein the dispersion phase (1) is a gas phase and the continuous phase (2) is a liquid phase.
(Aspect 10)

The microdroplet-producing device according to aspect 7 or 8, wherein the dispersion phase (1) and the continuous phase (2) are both liquid phases.
(Aspect 11)

The microdroplet-producing device according to aspect 10, wherein the inner walls of the microflow channels (9) are formed of hydrophobic surfaces, the dispersion phase (1) is an aqueous phase and the continuous phase (2) is an organic phase.
(Aspect 12)

The microdroplet-producing device according to aspect 10, wherein the inner walls of the microflow channels (9) are formed of hydrophilic surfaces, the dispersion phase (1) is an organic phase and the continuous phase (2) is an aqueous phase.

Advantageous Effects of Invention

According to the invention it is possible to provide a microdroplet- or bubble-producing device that does not require separate through-holes for different liquid droplet/air bubble-producing flow channels. The invention can also provide a microdroplet- or bubble-producing device which, instead of having droplet/air bubble-producing flow channels configured in a two-dimensional plane as in a conventional device, has a simple construction wherein slit(s) and a microflow channel array are combined in a three-dimensional manner, allowing easier mounting and management than in the prior art, and having the microdroplet-forming units configured in a highly dense manner.

DESCRIPTION OF EMBODIMENTS

Figure 1:
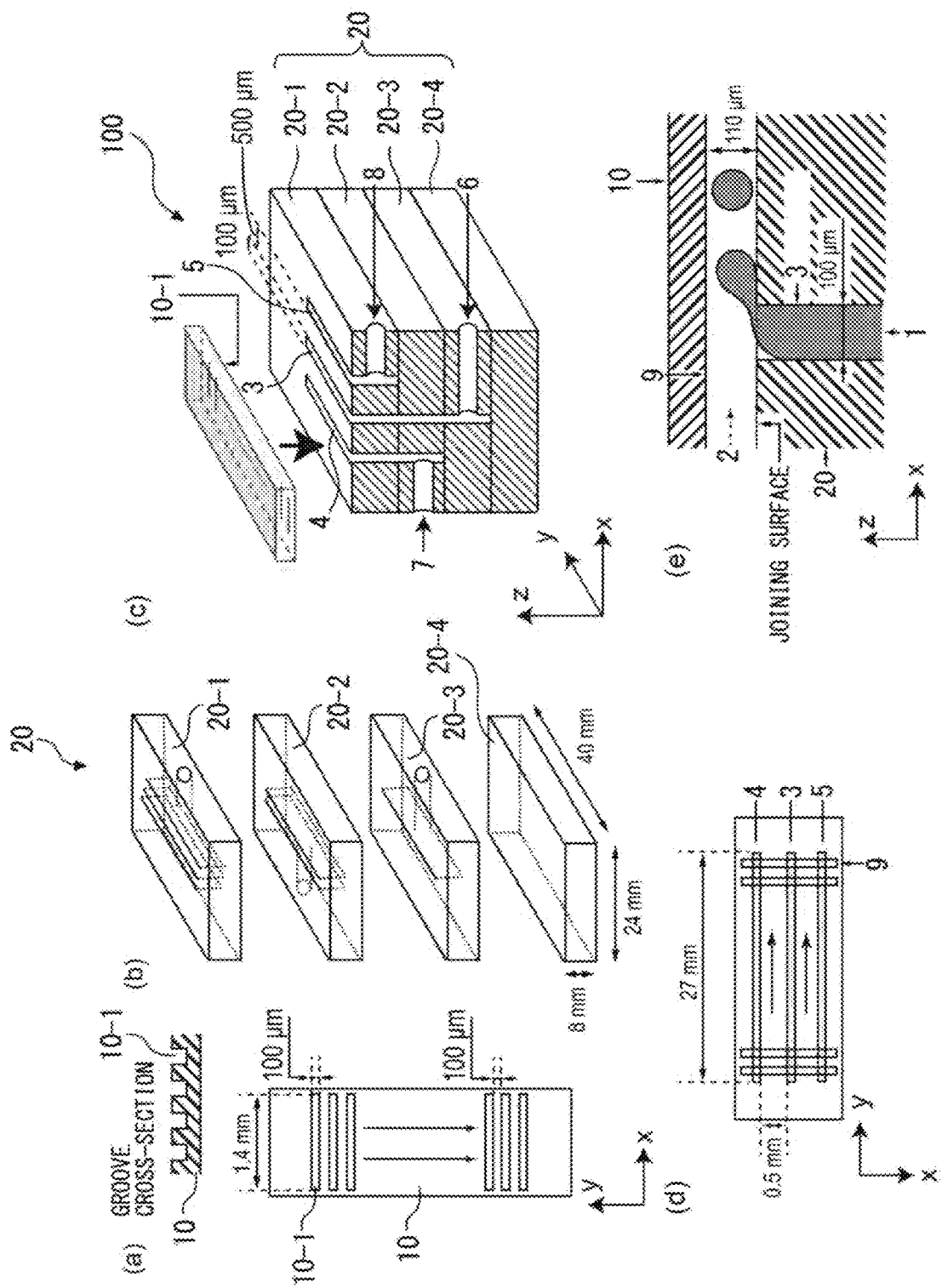
FIG. 1 shows an example of a three-dimensionally arranged droplet/air bubble-producing flow channel in a microdroplet/bubble-producing device of the invention.

The present invention relates to a microdroplet/bubble-producing device provided with slit(s) (3, 4, 5) and a row of a plurality of microflow channels (9), wherein:
- the slit(s) (3, 4, 5) is/are one or more of a continuous phase supply slit (4), a dispersion phase supply slit (3) and a discharge slit (5),
- at least one of the slit(s) (3, 4, 5) is sandwiched between any two from among a dispersion phase supply port (6), a continuous phase supply port (7) and a discharge port (8),
- the plurality of microflow channels (9) are disposed at the face perpendicular to the sandwiched slit(s), which is present at the end of the sandwiched slit(s), so as to connect the end of the sandwiched slit(s) with two supply ports on both sides or with a supply port and a discharge port,
- a dispersion phase (1) is supplied from a dispersion phase supply port (6) while a continuous phase (2) is supplied from a continuous phase supply port (7),
- either or both the dispersion phase (1) and continuous phase (2) are distributed in the plurality of microflow channels (9), and
- at the sites of connection between the sandwiched slit(s) and the microflow channels (9), flow of the continuous phase (2) is sheared by the dispersion phase (1) as the driving force, forming droplets or air bubbles of the dispersion phase (1), and the product is recovered from the discharge port.

The microdroplet/bubble-producing device of the invention comprises slit(s), and a row of a plurality of microflow channels.

According to the invention, the slit has a linear slit end face with a width and an axis line (a slit length) having a larger dimension than the size of the width in a reference plane, the reference plane being a flat plane on which the row of the plurality of microflow channels exists, and the slit having the reference plane as their end and extending from the reference plane in the transverse direction of the reference plane. The shape of the slit end face is not particularly restricted, and may be straight linear or annular, for example. The dimension of the slit in the transverse direction may be considered to be the depth (height) of the slit.

The row of the plurality of microflow channels is arranged on the reference plane, the row of the plurality of microflow channels being connected in the reference plane with the slit(s) whose end(s) is/are at the reference plane. In other words, the plurality of microflow channels have the sites of connection with the slit(s) in the reference plane.

The microdroplet/bubble-producing device of the invention has a dispersion phase supply port, a continuous phase supply port and a discharge port. The dispersion phase supply port is a transport channel or path that supplies a dispersion phase to the plurality of microflow channels, and it has the sites of connection with the plurality of microflow channels. The continuous phase supply port is a transport channel or path that supplies a continuous phase to the plurality of microflow channels, and it has the sites of connection with the plurality of microflow channels. The discharge port is a transport channel or path that discharges the produced droplets and air bubbles from the plurality of microflow channels, and it also has the site of connection with the plurality of microflow channels.

The slit(s) is/are one or more from among the dispersion phase supply slit, continuous phase supply slit and discharge slit. The dispersion phase supply slit, continuous phase supply slit and discharge slit form portions of the dispersion phase supply port, continuous phase supply port and discharge port, respectively, and have the sites of connection with the plurality of microflow channels as their end.

In the microdroplet/bubble-producing device of the invention, at least one of the slit(s) (hereunder referred to as "specified slit(s)") is configured in a manner sandwiched between two from among the dispersion phase supply port, continuous phase supply port and discharge port. Typically, when the slit is the continuous phase supply slit, it will be sandwiched between the dispersion phase supply port and discharge port, when the slit is the dispersion phase supply slit it will be sandwiched between the continuous phase supply port and discharge port, and when the slit is the discharge port it will be sandwiched between the dispersion phase supply slit and continuous phase supply port. However, the slit (supply port or discharge port) and the supply port/discharge port on either side of it are not necessarily a different supply port/discharge port, and either or both the slit (supply port or discharge port) and the supply port/discharge port on either side of it may be the same supply port/discharge port (as in the example mentioned below). Here, "configured in a manner sandwiched between two" is defined as being configured so that based on the sites of connection where the dispersion phase supply port, continuous phase supply port and discharge port are respectively connected to the microflow channels, two of the sites of connection of the dispersion phase supply port, continuous phase supply port and discharge port are sandwiching the slit.

The plurality of microflow channels are configured so as to connect the end of the specified slit with the two supply ports or the supply port and discharge port on either side, in the plane perpendicular to the specified slit (the reference plane), where the end of the specified slit exists. The supply port or discharge port on either side of the specified slit is the nearest supply port or discharge port on both sides of the specified slit.

In the microdroplet/bubble-producing device having this construction, the dispersion phase is supplied from the dispersion phase supply port while the continuous phase is supplied from the continuous phase supply port, and either or both the dispersion phase and continuous phase are distributed into the plurality of microflow channels. Here, "distributed into the plurality of microflow channels" means that the dispersion phase and/or continuous phase supplied from the dispersion phase supply port and/or continuous phase supply port on one or both sides of the specified slit is distributed into the plurality of microflow channels that are between the dispersion phase supply port and/or continuous phase supply port and the specified slit. When only either one of the dispersion phase and continuous phase is distributed into the plurality of microflow channels, the other of the dispersion phase and continuous phase is supplied into the specified slit, and eventually reaches the site of connection with the plurality of microflow channels.

As a result, at the site of connection between the specified slit and the microflow channels, the continuous phase flow meets the dispersion phase flow, shearing the dispersion phase with the continuous phase flow as the driving force and producing droplets or air bubbles of the dispersion phase, which are recovered from the discharge port (as droplets or air bubbles). In other words, droplets or air bubbles are produced at the site of connection between the specified slit and the microflow channel. The site of connection between the specified slit and the microflow channels on both sides is the site where the specified slit meets the microflow channels on both sides, but the locations where the microflow channels on both sides meet do not necessarily have to be the same locations of the specified slit, and may be locations at positions shifted from each other (see FIG. 4 and FIG. 8). The dispersion phase and continuous phase are supplied to two of the total of 3 different flow channels or paths that are the specified slit and the microflow channels on both sides, the dispersion phase undergoing shear with the continuous phase flow as the driving force at the locations where the dispersion phase flow channel and the continuous phase flow channel meet (the above site of connection), producing droplets or air bubbles of the dispersion phase which are recovered from the remaining flow channel among the 3 different flow channels or paths (as droplets or air bubbles).

Thus, while the specified slit forms a portion of the dispersion phase supply port, continuous phase supply port or discharge port, at the same time it also serves as an element providing the function of producing droplets or air bubbles of the dispersion phase from the dispersion phase and continuous phase, at the site of connection with the microflow channels on both sides.

The microdroplet/bubble-producing device of the invention may have one specified slit, or two or more. When it has two or more specified slits, one example is where the supply ports and discharge port are configured in the reference plane in the order: <continuous phase supply port-dispersion phase supply port (#1)-dispersion phase supply port (#2)-discharge port>, the dispersion phase supply port (#1) and dispersion phase supply port (#2) being slits, and the microflow channels connecting their supply ports and discharge ports. In this case, the dispersion phase supply port (#1) and dispersion phase supply port (#2) have, on one of both sides of each, the same dispersion phase supply port as the specified slit (this is the example referred to above). However, the dispersion phase supply port (#1) and dispersion phase supply port (#2) are still both configured in a manner sandwiched between the continuous phase supply port and discharge port.

In the microdroplet/bubble-producing device of the invention, the continuous phase supply port, dispersion phase supply port or discharge port other than the specified slit may have a slit as the end connected with microflow channels. Therefore, while there is at least one specified slit in the microdroplet/bubble-producing device of the invention, the number of slits may be more than the number of specified slit(s). For example, when configuration in the reference plane is in the order: <continuous phase supply port-dispersion phase supply port-discharge port> and the dispersion phase supply port is the specified slit, the ends of the continuous phase supply port and discharge port may optionally be slits. Alternatively, the ends of the continuous phase supply port and discharge port may be cylindrical holes.

According to one aspect, the invention is the following microdroplet/bubble-producing device (100). A microdroplet/bubble-producing device (100) comprising slit(s) (3, 4, 5) and a row of a plurality of microflow channels (9), wherein:
the device (100) has a reference plane (x, y plane) containing the row of the plurality of microflow channels (9), and a transverse direction (z-direction) perpendicular to the reference plane,
the device (100) has a dispersion phase supply port (6) and continuous phase supply port (7) for the plurality of microflow channels (9) and a discharge port (8) from the plurality of microflow channels (9), the dispersion phase supply port (6), continuous phase supply port (7) and discharge port (8) having respective sites of connection with the plurality of microflow channels (9),
the slit(s) (3, 4, 5) has/have a linear slit end face with a width and a longitudinal dimension (slit length) that is larger than the size of the width in the reference plane, extending from the reference plane in the transverse direction with the reference plane as its/their end(s), and having sites of connection with the plurality of microflow channels (9) in the reference plane,
the slit(s)(3, 4, 5) is/are one or more from among the continuous phase supply slit (4), dispersion phase supply slit (3) and discharge slit (5), where the continuous phase supply slit (4), dispersion phase supply slit (3) and discharge slit (5) form portions of the dispersion phase supply port (6), continuous phase supply port (7) and discharge port (8), respectively,
at least one of the slit(s) (3, 4, 5) (hereunder referred to as "specified slit") is configured so as to be sandwiched between any two from among a dispersion phase supply port (6), a continuous phase supply port (7) and a discharge port (8), where "configured so as to be sandwiched between" is based on the positional relationship between the specified slit and the locations of the sites of connection between the dispersion phase supply port (6), continuous phase supply port (7) and discharge port (8), and the plurality of microflow channels (9),
the specified slit(s), and any two from among the dispersion phase supply port (6), continuous phase supply port (7) and discharge port (8) configured on both sides sandwiching the specified slit(s), are connected via the plurality of microflow channels (9),
a dispersion phase is supplied from the dispersion phase supply port (6) to the plurality of microflow channels (9) while a continuous phase is supplied from the continuous phase supply port (7) to the plurality of microflow channels (9), and
at the sites of connection between the specified slit(s) and the plurality of microflow channels, droplets or air bubbles of the dispersion phase are produced by shearing of the dispersion phase with the continuous phase flow as the driving force, and are recovered from the discharge port.

According to the invention, the sizes of the microflow channels may be determined according to the purpose of use, but usually the width and height will be about 0.1 to 1000 µm, and preferably about 1 to 200 µm. The cross-sectional shapes of the microflow channels are not particularly restricted, but are preferably selected from among rectangular, trapezoid, triangular, half-circular, circular, elliptical and half-elliptical shapes, depending on the materials to be worked and the working means.

The width of the slit will usually be about 1 to 1000 µm and is preferably about 10 to 500 µm.

For formation of droplets according to the invention, the liquid forming the dispersion phase and continuous phase is preferably an organic compound or water. The organic compound is not particularly restricted, but it is preferably an alkane such as decane or octane, a halogenated hydrocarbon such as chloroform, an aromatic hydrocarbon such as toluene or a fatty acid such as oleic acid. In order to obtain solid or gel-like microparticles, the dispersion phase used may be an aqueous phase or organic phase that can be hardened by thermal or photopolymerization reaction, and the material used may be a known polymerizable monomer, oligomer or polymer, for example, and is preferably an acrylate-based monomer or styrene-based monomer.

For formation of droplets, the combination of dispersion phase and continuous phase may usually be an oil-in-water (O/W), oil-in-oil (O/O) or water-in-oil (W/O) type.

For formation of air bubbles according to the invention, the dispersion phase may be a gas and the continuous phase may be a liquid composed of an aqueous phase or organic phase. The gas is not particularly restricted and may be air, oxygen, nitrogen, carbon dioxide or argon gas.

The flow rate of the dispersion phase and continuous phase per single microflow channel will depend on the type, but it will usually be selected to be about 0.001 mL to 10 mL/hr.

According to embodiment 1 of the invention, the microdroplet/bubble-producing device (100) is constructed of a microgroove array panel with a plurality of paralleled straight linear microgrooves (10) having a rectangular cross-sectional shape, and a liquid- or gas-distributing part (20) (FIG. 1). The microgroove array panel (also referred to as "microflow channel array") (10) has 125 straight linear microgrooves (10-1) with rectangular cross-sectional shapes (100 µm width, 110 µm height), the gap between the adjacent grooves being 100 µm (FIG. 1(*a*)).

In FIG. 1, the liquid- or gas-distributing part (20) is composed of four members each with a width of 24 mm, a length of 40 mm and a height of 8 mm (FIG. 1(*b*)). The first member (20-1) at the uppermost section has a continuous phase supply slit (4), a dispersion phase supply slit (3), a product discharge slit (5) and a discharge port (8). The second member (20-2) at the second level from the top has a continuous phase supply slit (4), a dispersion phase supply slit (3) and a continuous phase supply port (7). The third member (20-3) at the third level from the top has a dispersion phase supply slit (3) and a dispersion phase supply port (6). The fourth member (20-4) at the lowermost section is a flat plate that closes the through-hole formed in the bottom of the third member (20-3) by the dispersion phase supply slit (3). FIG. 1(*c*) shows a cross-sectional perspective view where the first to fourth members of the liquid- or gas-distributing part (20) are combined. The dispersion phase (1) and continuous phase (2) that are supplied flow through the slit-shaped flow channels (3, 4) inside the device (100) from the lower layer and are supplied to the top of the device (100). That is, the dispersion phase (1) is supplied from the dispersion phase supply port (6) of the third member (20-3) into the dispersion phase supply slit (3), the continuous phase (2) is supplied from the continuous phase supply port (7) of the second member (20-2) into the continuous phase supply slit (4), and the continuous phase (2) and dispersion phase (1) are each directed upward in the respective slits (3, 4). The portions other than the slits are shown here as the dispersion phase supply port (6), continuous phase supply port (7) and discharge port (8) to emphasize the shapes of the slits, but according to the disclosure the slits are functionally portions of the dispersion phase supply port (6), continuous phase supply port (7) or discharge port (8), as mentioned above (this implicitly also applies to the embodiments described below).

The microgroove array panel (10) is positioned to match the three slits on the liquid- or gas-distributing part (20), i.e. the continuous phase supply slit (4), the dispersion phase supply slit (3) and the product discharge slit (5), and is bonded as shown in FIG. 1(d). The long side widths at the slit end sections are 27 mm, the short side widths are 100 µm, and the slits are separated apart by 0.5 mm. In FIG. 1(d), the continuous phase (2) is supplied to the top slit (4) and the dispersion phase (1) is supplied to the center slit (3), the continuous phase (2) being supplied to the microflow channels (9) formed by the microgrooves (10-1), and the product produced at the site of connection between the dispersion phase supply slit (3) and the microflow channels (9) is discharged through the microflow channels (9) from the slit (5) at the lower end. FIG. 1(e) shows the state where a droplet or air bubble is produced inside the device (100). At the sites of connection between the dispersion phase supply slit (3) and the microflow channels (9), the dispersion phase (1) are subjected to shear by the flow of the continuous phase (2), forming droplets or air bubbles. The product is discharged through the discharge slit (5) from the discharge port (8).

Figure 2:
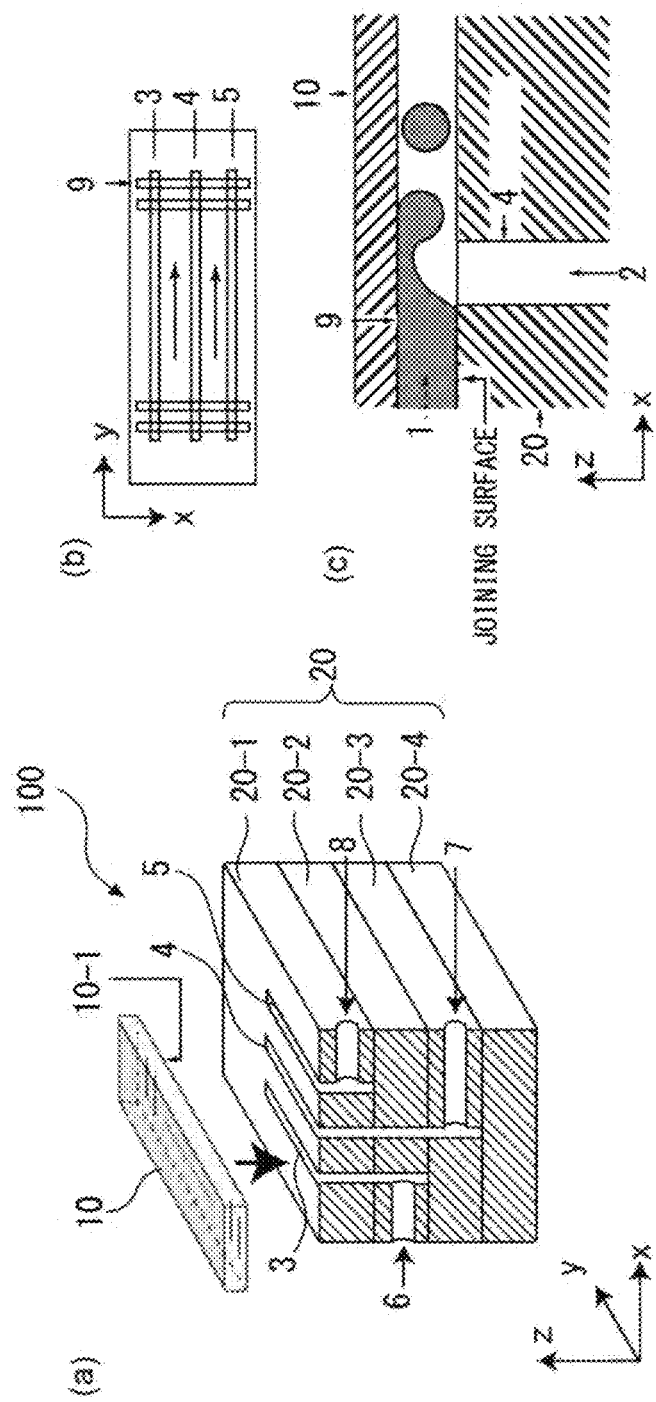
FIG. 2 is a diagram showing one embodiment of the microdroplet/bubble-producing device of the invention, (a) being a cross-sectional view of a matrix-like liquid distributing device after assembly, (b) being a top view after the part with microgrooves and the liquid distributing device have been joined, and (c) showing the state where droplets are produced at the intersection between the slit and microflow channels.

According to embodiment 2 of the invention, the liquid- or gas-distributing part (20) is constructed of four members (FIG. 2). The first member (20-1) at the uppermost section has a continuous phase supply slit (4), a dispersion phase supply slit (3), a product discharge slit (5) and a discharge port (8). The second member (20-2) at the second level from the top has a continuous phase supply slit (4), a dispersion phase supply slit (3) and a dispersion phase supply port (6). The third member (20-3) at the third level from the top has a continuous phase supply slit (4) and a continuous phase supply port (7). The fourth member (20-4) at the lowermost section is a flat plate that closes the through-hole formed in the bottom of the third member (20-3) by the continuous phase supply slit (4) (FIG. 2). FIG. 2(a) shows a cross-sectional perspective view where the first to fourth members of the liquid- or gas-distributing part (20) are combined. The dispersion phase (1) and continuous phase (2) that are supplied flow from the lower layer through the slits, and are supplied to the top of the liquid- or gas-distributing part (20). That is, the dispersion phase (1) is supplied from the dispersion phase supply port (6) of the second member (20-2) into the dispersion phase supply slit (3), the continuous phase (2) is supplied from the continuous phase supply port (7) of the third member (20-3) into the continuous phase supply slit (4), and the continuous phase (2) and dispersion phase (1) are each directed upward in the respective slits.

The microgroove array panel (10) is positioned to match the three slits on the liquid- or gas-distributing part (20), i.e. the continuous phase supply slit (4), the dispersion phase supply slit (3) and the discharge slit (5), and is bonded as shown in FIG. 2(b). In FIG. 2(b), the dispersion phase (1) is supplied to the top slit (3) and the continuous phase (2) is supplied to the center slit (4), the dispersion phase (1) being supplied to the microflow channels (9) formed by the microgrooves (10-1), and the product produced at the site of connection between the continuous phase supply slit (4) and the microflow channels (9) is discharged through the microflow channels (9) from the slit (5) at the lower end. FIG. 2(c) shows the state where a droplet or air bubble is produced inside the device. At the site of connection between the continuous phase supply slit (4) and the microflow channels (9), the dispersion phase (1) is subjected to shear by the flow of the continuous phase (2), forming droplets or air bubbles. The product is discharged through the discharge slit (5) from the discharge port (8).

Figure 3:
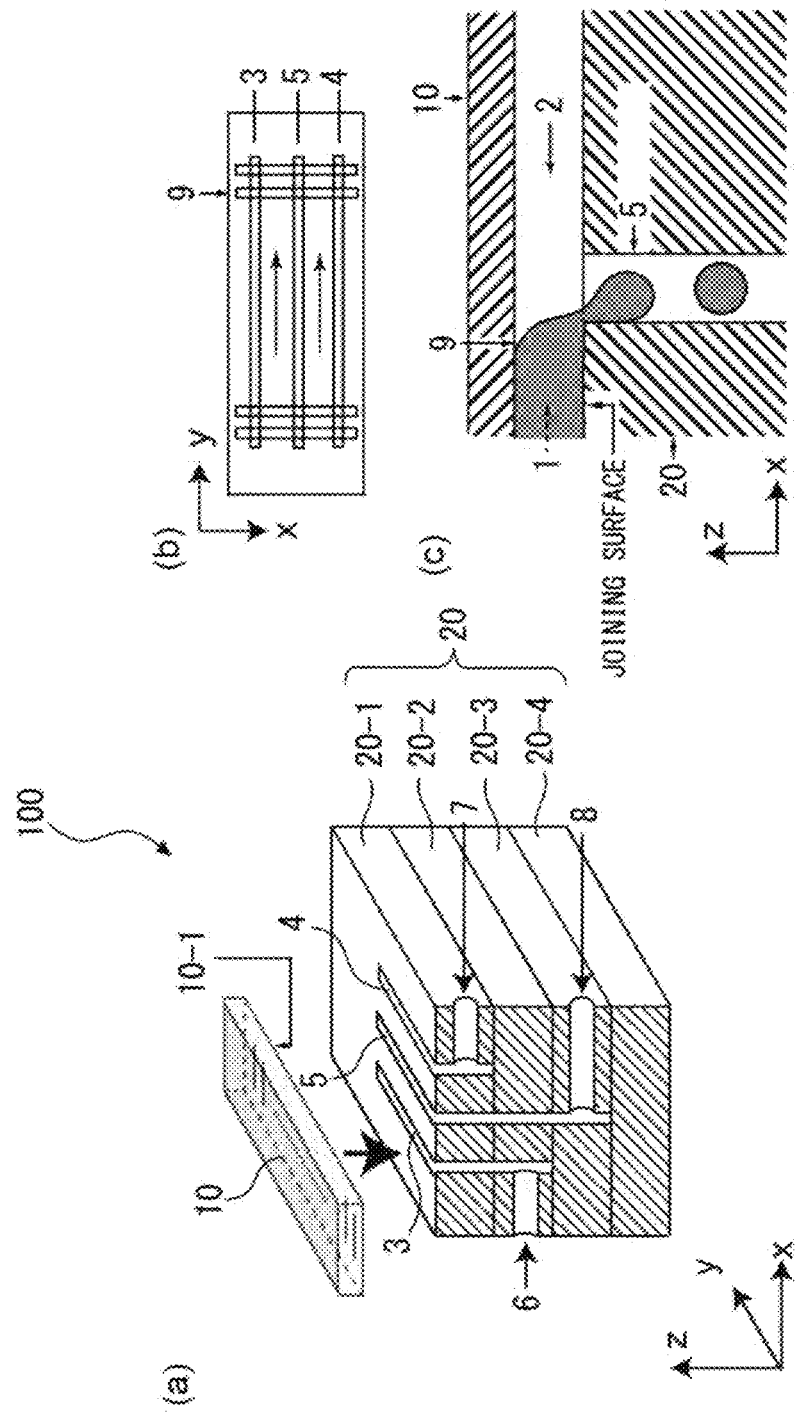
FIG. 3 is a diagram showing one embodiment of the microdroplet/bubble-producing device of the invention, (a) being a cross-sectional view of a matrix-like liquid distributing device after assembly, (b) being a top view after the part with microgrooves and the liquid distributing device have been joined, and (c) showing the state where droplets are produced at the intersection between the slit and microflow channels.

According to embodiment 3 of the invention, the liquid- or gas-distributing part (20) is constructed of four members (FIG. 3). The first member (20-1) at the uppermost section has a continuous phase supply slit (4), a dispersion phase supply slit (3), a product discharge slit (5) and a continuous phase supply port (7). The second member (20-2) at the second level from the top has a discharge slit (5), a dispersion phase supply slit (3) and a dispersion phase supply port (6). The third member (20-3) at the third level from the top has a discharge slit (5) and a discharge port (8). The fourth member (20-4) at the lowermost section is a flat plate that closes the through-hole formed in the bottom of the third member (20-3) by the discharge slit (5). FIG. 3(a) shows a cross-sectional perspective view where the first to fourth members of the liquid- or gas-distributing part (20) are combined. The dispersion phase (1) and continuous phase (2) that are supplied flow from the lower layer through the slits, and are supplied to the top of the liquid- or gas-distributing part (20). That is, the dispersion phase (1) is supplied from the dispersion phase supply port (6) of the second member (20-2) into the dispersion phase supply slit (3), the continuous phase (2) is supplied from the continuous phase supply port (7) of the first member (20-1) into the continuous phase supply slit (4), and the continuous phase (2) and dispersion phase (1) are each directed upward in the respective slits (4, 3).

The microgroove array panel (10) is positioned to match the three slits on the liquid- or gas-distributing part (20), i.e. the continuous phase supply slit (4), the dispersion phase supply slit (3) and the discharge slit (5), and is bonded as shown in FIG. 3(b). In FIG. 3(b), the dispersion phase (1) is supplied to the top slit (3) and the continuous phase (2) is supplied to the bottom slit (4), the dispersion phase (1) and continuous phase (2) being supplied to the microflow channels (9) formed by the microgrooves (10-1), and the product produced at the site of connection between the discharge slit (5) and the microflow channels (9) is discharged through the center slit (5). FIG. 3(c) shows the state where a droplet or air bubble is produced inside the device. At the site of connection between the discharge slit (5) and the microflow channels (9), the dispersion phase (1) is subjected to shear by the flow of the continuous phase (2), forming droplets or air bubbles. The product is discharged through the discharge slit (5) from the discharge port (8).

Figure 4:
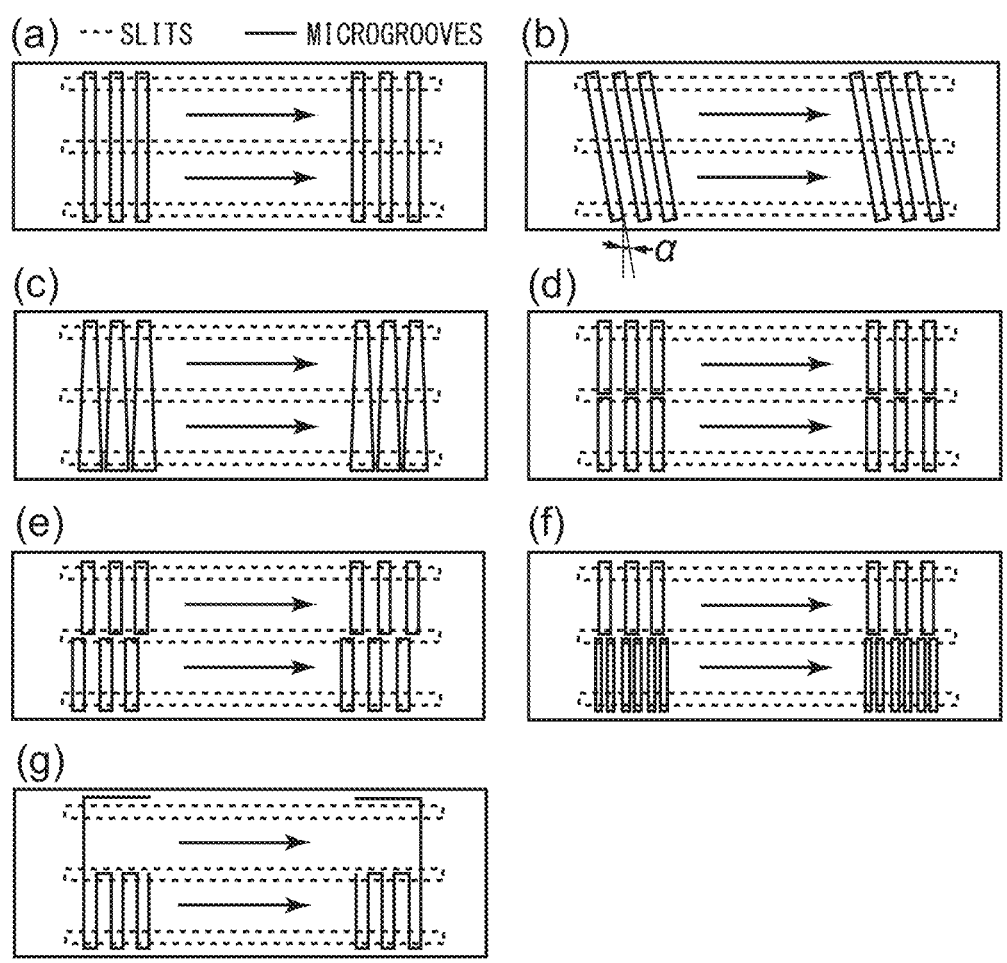
FIG. 4 is a diagram showing an example of a groove arrangement in a part having microgrooves joined to a liquid-distributing device of the invention.

FIG. 4 shows the groove shapes of the part (10) having microgrooves (10-1) that is joined to the liquid- or gas-distributing part (20) in embodiments 1 to 3 of the invention. FIG. 4(a) is a case where the row of straight linear microflow channels (solid lines) is bridging three slits (dotted lines) in a perpendicular manner, FIG. 4(b) is a case where the row of straight linear microflow channels (solid lines) is bridging three slits (dotted lines) in a diagonal manner, and FIG. 4(c) is a case where the widths of the microflow channels (solid lines) bridging the three slits vary in a continuous manner. The widths of the microgrooves may also vary in a discontinuous manner. FIGS. 4(d) to (f) are cases where the microflow channels (solid lines) connecting the slits (dotted lines) are divided on both sides of a sandwiched slit (dotted line), FIG. 4(*d*) being a case where the locations and sizes match, FIG. 4(*e*) being a case where the locations are shifted and FIG. 4(*f*) being a case where the correspondence is not 1:1. FIG. 4(*g*) shows a case where rows of bridging microflow channels (solid lines) are partially joined together. The features shown in FIGS. 4(*a*) to (*g*) may also be arbitrarily combined.

For embodiments 1 to 3 of the invention, the microgroove array panel (10) can be fabricated by transfer of a pattern from a die produced using SU-8 (product of Nippon Kayaku Co., Ltd.), which is a negative-type photoresist on a Si substrate, onto a silicone resin (PDMS: polydimethylsiloxane). The liquid- or gas-distributing part (20) can be fabricated by machining a stainless steel material (SUS304), for example. The slit-shaped through-holes of the liquid- or gas-distributing part (20) can be formed by wire electrical discharge machining, for example.

For embodiments 1 to 3 of the invention, W/O droplets are produced by delivering, for example, a dispersion phase of purified water, and a continuous phase of a fluorine-based oil, etc. with addition of a surfactant at 1 wt %. A glass syringe and syringe pump, for example, may be used for delivery of the dispersion phase and continuous phase. For observation of droplet or air bubble formation and measurement of the sizes of the produced droplets or air bubbles, it is preferred to use a combination of an upright optical microscope and a high-speed video camera.

Figure 5:
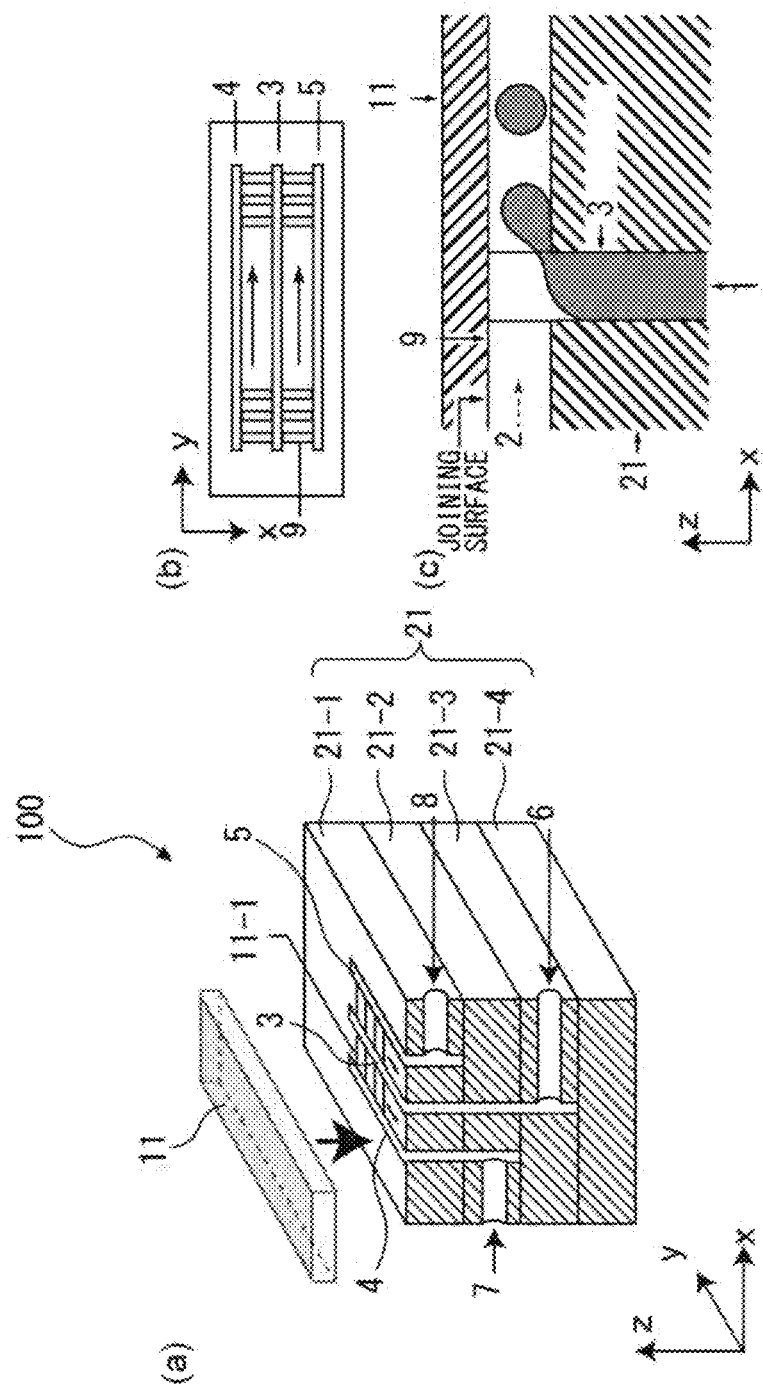
FIG. 5 is a diagram showing one embodiment of the microdroplet/bubble-producing device of the invention, (a) being a cross-sectional view of a matrix-like liquid distributing device after assembly, (b) being a top view after a cover has been joined to a liquid distributing device formed with the microgrooves, and (c) showing the state where droplets are produced at the intersections between the slits and microflow channels.

According to embodiment 4 of the invention, the liquid- or gas-distributing part (21) is constructed of four members (FIG. 5). The first member (21-1) at the uppermost section has a continuous phase supply slit (4), a dispersion phase supply slit (3), a product discharge slit (5), an array of microgrooves (11-1) bridging together the respective slits, and a discharge port (8) connected to the product discharge slit (5). The second member (21-2) at the second level from the top has a continuous phase supply slit (4), a dispersion phase supply slit (3) and a continuous phase supply port (7). The third member (21-3) at the third level from the top has a dispersion phase supply slit (3) and a dispersion phase supply port (6). The fourth member (21-4) at the lowermost section is a flat plate that closes the through-hole formed in the bottom of the third member (21-3) by the dispersion phase supply slit (3). FIG. 5(*a*) shows a cross-sectional perspective view where the first to fourth members of the liquid- or gas-distributing part (21) are combined. The dispersion phase (1) and continuous phase (2) that are supplied flow from the lower layer through the slits, and are supplied to the top of the liquid- or gas-distributing part (21). Specifically, the continuous phase (2) is supplied from the continuous phase supply port (7) of the second member (21-2) into the continuous phase supply slit (4), the dispersion phase (1) is supplied from the dispersion phase supply port (6) of the third member (21-3) into the dispersion phase supply slit (3), and the continuous phase (2) and dispersion phase (1) are each directed upward in the respective slits.

FIG. 5(*b*) shows the liquid- or gas-distributing part (21) joined with a cover (11) for sealing the three slits on the liquid- or gas-distributing part (21), i.e. the continuous phase supply slit (4), the dispersion phase supply slit (3) and the discharge slit (5), and the microgrooves (11-1). In FIG. 5(*b*), the continuous phase (2) is supplied to the top slit and the dispersion phase (1) is supplied to the center slit (3), the continuous phase (2) being supplied to the microflow channels (9) formed by the microgrooves (11-1), and the product produced at the site of connection between the dispersion phase supply slit (3) and the microflow channels (9) is discharged through the microflow channels (9) at the slit (5) at the lower end. FIG. 5(*c*) shows the state where a droplet or air bubble is produced inside the device. At the site of connection between the dispersion phase supply slit (3) and the microflow channels (9), the dispersion phase (1) is subjected to shear by the flow of the continuous phase (2), forming droplets or air bubbles. The product is discharged through the discharge slit (5) from the discharge port (8).

Figure 6:
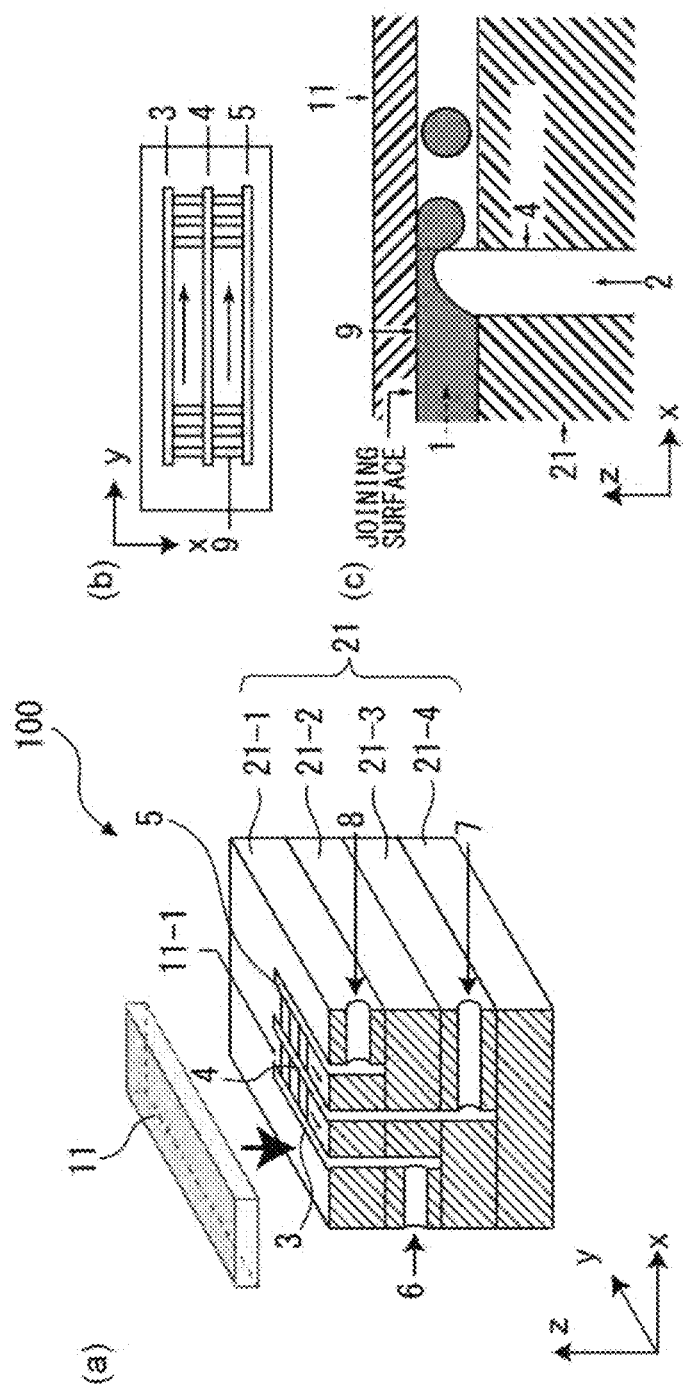
FIG. 6 is a diagram showing one embodiment of the microdroplet/bubble-producing device of the invention, (a) being a cross-sectional view of a matrix-like liquid distributing device after assembly, (b) being a top view after a cover has been joined to a liquid distributing device formed with the microgrooves, and (c) showing the state where droplets are produced at the intersections between the slits and microflow channels.

According to embodiment 5 of the invention, the liquid- or gas-distributing part (21) is constructed of four members (FIG. 6). The first member (21-1) at the uppermost section has a continuous phase supply slit (4), a dispersion phase supply slit (3), a product discharge slit (5), microgrooves (11-1) bridging the respective slits, and a discharge port (8) (FIG. 6). The second member (21-2) at the second level from the top has a continuous phase supply slit (4), a dispersion phase supply slit (3) and a dispersion phase supply port (6). The third member (21-3) at the third level from the top has a continuous phase supply slit (4) and a continuous phase supply port (7). The fourth member (21-4) at the lowermost section is a flat plate that closes the through-hole formed in the bottom of the third member (21-3) by the continuous phase supply slit (4). FIG. 6(*a*) shows a cross-sectional perspective view where the first to fourth members of the liquid- or gas-distributing part (21) are combined. The dispersion phase (1) and continuous phase (2) that are supplied flow from the lower layer through the slits (3, 4), and are supplied to the top of the liquid- or gas-distributing part (21). That is, the dispersion phase (1) is supplied from the dispersion phase supply port (6) of the second member (21-2) into the dispersion phase supply slit (3), the continuous phase (2) is supplied from the continuous phase supply port (7) of the third member (21-3) into the continuous phase supply slit (4), and the continuous phase (2) and dispersion phase (1) are each directed upward in the respective slits.

FIG. 6(*b*) shows the liquid- or gas-distributing part (21) joined with a cover (11) for sealing the three slits on the liquid- or gas-distributing part (21), i.e. the continuous phase supply slit (4), the dispersion phase supply slit (3) and the discharge slit (5), and the microgrooves (11-1). In FIG. 6(*b*), the dispersion phase (1) is supplied to the top slit (3) and the continuous phase (2) is supplied to the center slit (4), the dispersion phase (1) being supplied to the microflow channels (9) formed by the microgrooves (11-1), and the product produced at the site of connection between the continuous phase supply slit (4) and the microflow channels (9) is discharged through the microflow channels (9) from the slit (5) at the lower end. FIG. 6(*c*) shows the state where a droplet is produced inside the device. At the site of connection between the continuous phase supply slit (4) and the microflow channels (9), the dispersion phase (1) is subjected to shear by the flow of the continuous phase (2), forming droplets or air bubbles. The product is discharged through the discharge slit (5) from the discharge port (8).

Figure 7:
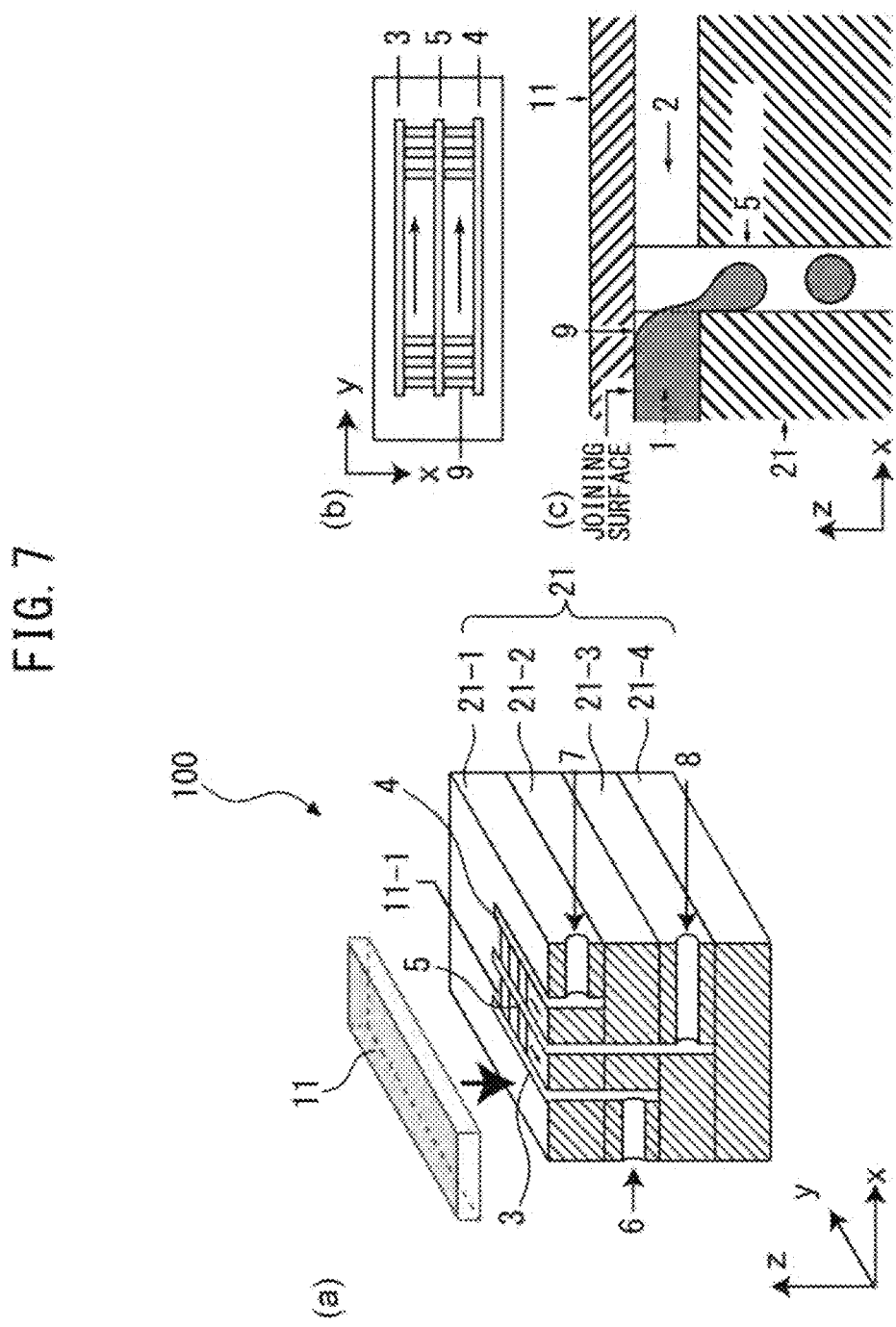
FIG. 7 is a diagram showing one embodiment of the microdroplet/bubble-producing device of the invention, (a) being a cross-sectional view of a matrix-like liquid distributing device after assembly, (b) being a top view after a cover has been joined to a liquid distributing device formed with the microgrooves, and (c) showing the state where droplets are produced at the intersections between the slits and microflow channels.

According to embodiment 6 of the invention, the liquid- or gas-distributing part (21) is constructed of four members (FIG. 7). The first member (21-1) at the uppermost section has a continuous phase supply slit (4), a dispersion phase supply slit (3), a discharge slit (5), microgrooves (11-1) bridging the respective slits, and a continuous phase supply port (7). The second member (21-2) at the second level from the top has a dispersion phase supply slit (3), a discharge slit (5) and a dispersion phase supply port (6). The third member (21-3) at the third level from the top has a discharge slit (5) and a discharge port (8). The fourth member (21-4) at the lowermost section is a flat plate that closes the through-hole formed in the bottom of the third member (21-3) by the discharge slit (5). FIG. 7(*a*) shows a cross-sectional perspective view where the first to fourth members of the liquid- or gas-distributing part (21) are combined. The dispersion phase (1) and continuous phase (2) that are supplied flow from the lower layer through the slits (3, 4), and are supplied to the top of the liquid- or gas-distributing part (21). That is, the dispersion phase (1) is supplied from the dispersion phase supply port (6) of the second member (21-2) into the dispersion phase supply slit (3), the continuous phase (2) is supplied from the continuous phase supply port (7) of the first member (21-1) into the continuous phase supply slit (4), and the continuous phase (2) and dispersion phase (1) are each directed upward in the respective slits.

FIG. 7(b) shows the liquid- or gas-distributing part (21) joined with a cover (11) for sealing the three slits on the liquid- or gas-distributing part (21), i.e. the continuous phase supply slit (4), the dispersion phase supply slit (3) and the discharge slit (5), and the microgrooves (11-1). In FIG. 7(b), the dispersion phase (1) is supplied to the top slit (3) and the continuous phase (2) is supplied to the bottom slit (4), the dispersion phase (1) and continuous phase (2) being supplied to the microflow channels (9) formed by the microgrooves (11-1), and the product produced at the site of connection between the discharge slit (5) and the microflow channels (9) is discharged through the center slit (5). FIG. 7(c) shows the state where a droplet is produced inside the device. At the site of connection between the discharge slit (5) and the microflow channels (9), the dispersion phase (1) is subjected to shear by the flow of the continuous phase (2), forming droplets or air bubbles. The product is discharged through the discharge slit (5) from the discharge port (8).

Figure 8:
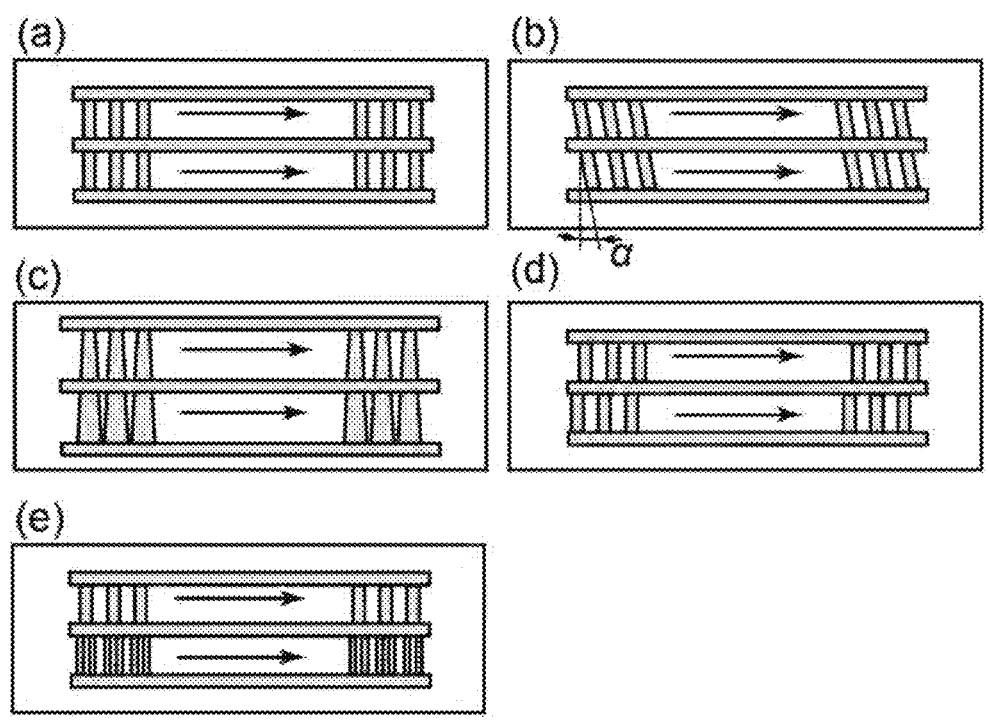
FIG. 8 is a diagram showing an example of the shapes of slits and microgrooves on a liquid-distributing device according to the invention.

FIG. 8 shows examples of microgroove shapes formed in the liquid- or gas-distributing part (21) of embodiments 4 to 6 of the invention. FIG. 8(a) is a case where three slits are bridged by straight linear microgrooves in a perpendicular manner, FIG. 8(b) is a case where they are bridged by straight linear microgrooves in a diagonal manner, and FIG. 8(c) is a case where the widths of the bridging microgrooves vary in a continuous manner. The widths of the microgrooves may also vary in a discontinuous manner. FIG. 8(d) is a case where the locations of the bridging microgrooves are shifted, and FIG. 8(e) is a case where the correspondence of the number of bridging microgrooves is not 1:1.

For embodiments 4 to 6 of the invention, the sealing cover (11) is preferably made of a transparent member such as a silicone resin (PDMS: polydimethylsiloxane), acrylic resin or glass. The liquid- or gas-distributing device is fabricated by machining a stainless steel material (SUS304), for example. The slit-shaped through-holes of the liquid- or gas-distributing device can be formed by wire electrical discharge machining, for example. The microgrooves bridging together the slits can be formed by machine cutting, laser working or etching.

For embodiments 4 to 6 of the invention, W/O droplets are produced by delivering, for example, a dispersion phase of purified water and a continuous phase of a fluorine-based oil, etc. with addition of a surfactant at 1 wt %. A glass syringe and syringe pump, for example, may be used for delivery of the dispersion phase and continuous phase. For observation of droplet or air bubble formation and measurement of the sizes of the produced droplets or air bubbles, it is preferred to use a combination of an upright optical microscope and a high-speed video camera.

Figure 9:
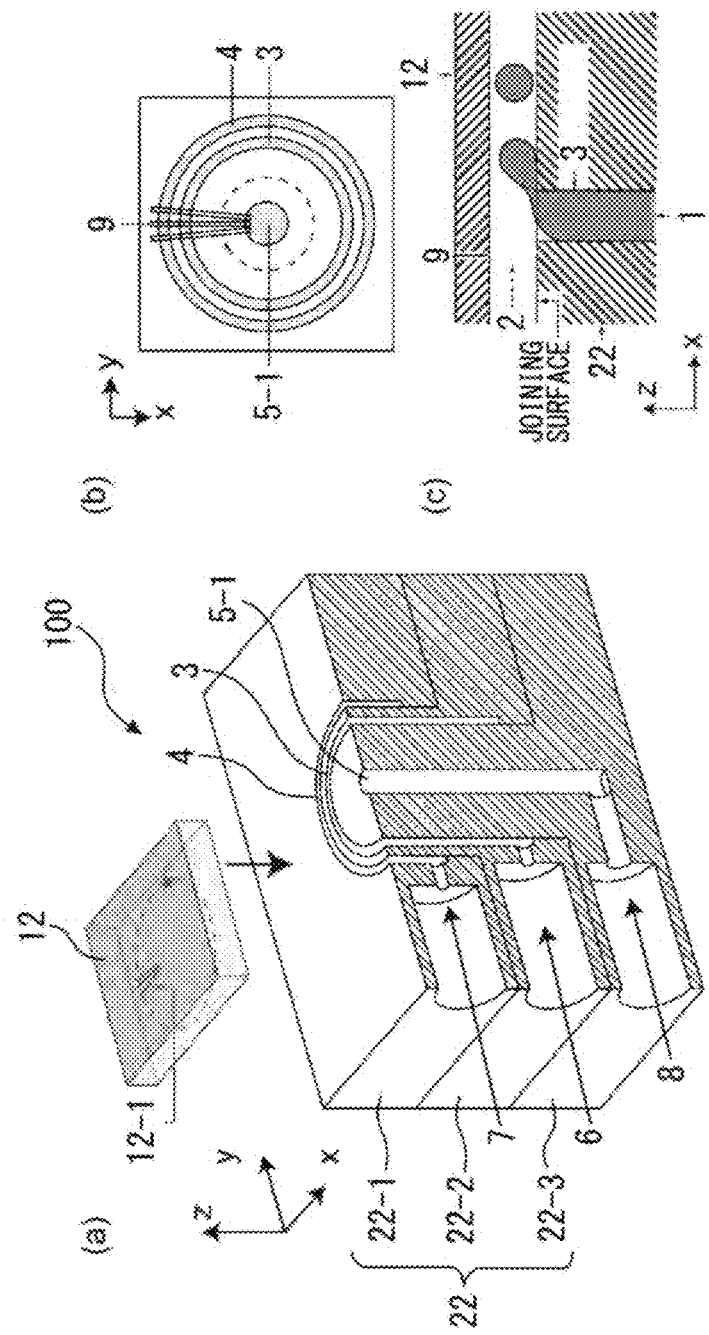
FIG. 9 is a diagram showing one embodiment of the microdroplet/bubble-producing device of the invention, (a) being a cross-sectional view of an annular liquid distributing device after assembly of three members, (b) being a top view after the part with microgrooves and the liquid distributing device have been joined, and (c) showing the state where droplets are produced at the intersections between the slits and microflow channels.

According to embodiment 7 of the invention, the liquid- or gas-distributing part (22) is constructed of three members (FIG. 9). The liquid- or gas-distributing part (22) is provided with an uppermost first member (22-1) comprising a continuous phase supply port (7), situated below the part (12) with microgrooves (12-1), a second member (22-2) on the second level from the top that comprises a dispersion phase supply port (6) and, in combination with the first member (22-1), forms an annular slit (4) for supply of the continuous phase (2), and a third member (22-3) on the third level from the top that, in combination with the second member (22-2), forms an annular slit (3) for supply of the dispersion phase (1) and comprises a center cylindrical hole for product discharge (5-1) and a discharge port (8) (FIG. 9). FIG. 9(a) shows a cross-sectional perspective view where the first to third members of the liquid- or gas-distributing part (22) are combined. The dispersion phase (1) and continuous phase (2) that are supplied flow from the lower layer through the annular slits (3, 4), and are supplied to the top of the liquid- or gas-distributing part (22). That is, the dispersion phase (1) is supplied from the dispersion phase supply port (6) of the second member (22-2) into the dispersion phase-supply annular slit (3), the continuous phase (2) is supplied from the continuous phase supply port (7) of the first member (22-1) into the continuous phase-supply annular slit (4), and the continuous phase (2) and dispersion phase (1) are each delivered upward in the respective slits. The portions other than the annular slits (3, 4) and cylindrical hole (5-1) are shown here as the dispersion phase supply port (6), continuous phase supply port (7) and discharge port (8) in order to emphasize the shapes of the annular slits (3, 4) and cylindrical hole (5-1), but according to the present disclosure the annular slits (3, 4) and cylindrical hole (5-1) are functionally portions of the dispersion phase supply port (6), continuous phase supply port (7) or discharge port (8) as mentioned above (the relationship between the dispersion phase supply port, continuous phase supply port and discharge port in their relation to the annular slits and cylindrical hole also implicitly applies to the embodiments described below).

FIG. 9(b) shows the liquid- or gas-distributing part (22) having the two slits (i.e. the continuous phase supply slit (4) and the dispersion phase supply slit (3)) and the cylindrical hole (5-1) as a portion of the discharge port (8), joined with the part (12) with microgrooves (12-1). In FIG. 9(b), the continuous phase (2) is supplied to the outer annular slit (4) and the dispersion phase (1) is supplied to the inner slit (3), the continuous phase (2) being supplied to the microflow channels (9) formed by the microgrooves (12-1), and the product produced at the site of connection between the dispersion phase supply slit (3) and the microflow channels (9) is discharged through the microflow channels (9) from the center discharge cylindrical hole (5-1). FIG. 9(c) shows the state where a droplet or air bubble is produced inside the device. At the site of connection between the dispersion phase supply slit (3) and the microflow channels (9), the dispersion phase (1) is subjected to shear by the flow of the continuous phase (2), forming droplets or air bubbles. The product is discharged through the discharge cylindrical hole (5-1) from the discharge port (8).

Figure 10:
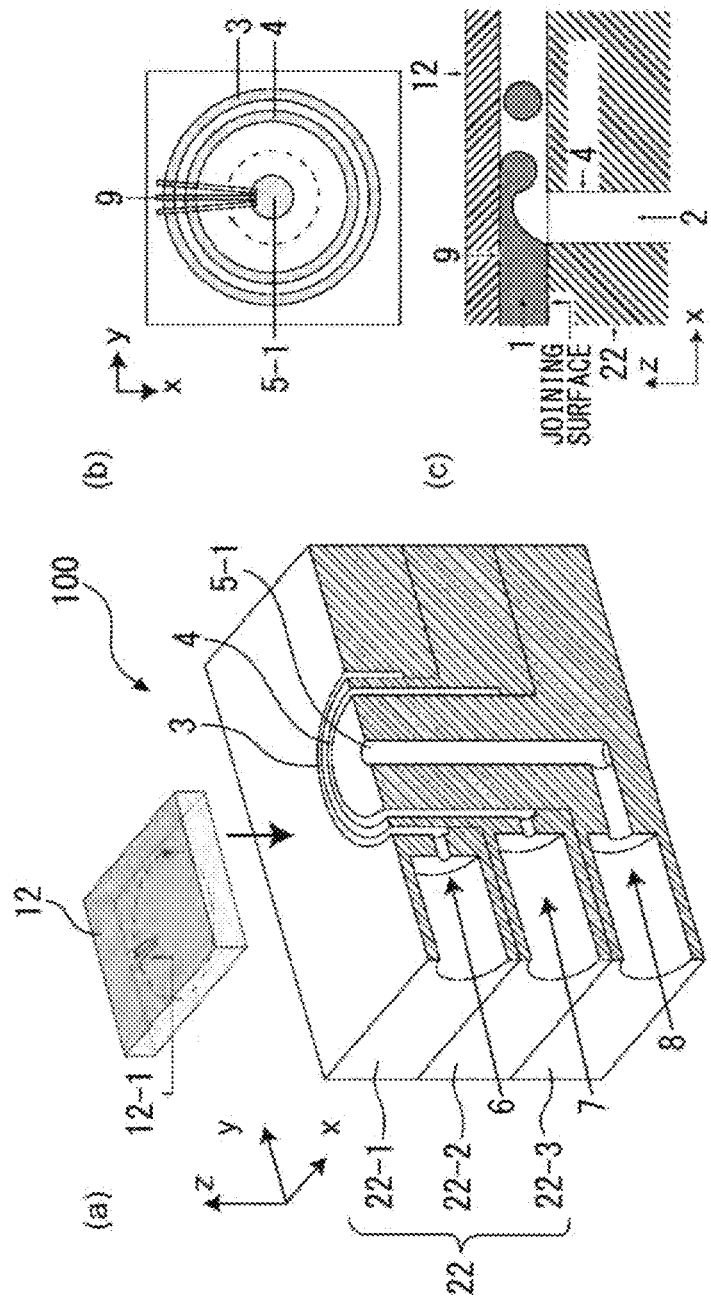
FIG. 10 is a diagram showing one embodiment of the microdroplet/bubble-producing device of the invention, (a) being a cross-sectional view of an annular liquid distributing device after assembly of three members, (b) being a top view after the part with microgrooves and the liquid distributing device have been joined, and (c) showing the state where droplets are produced at the intersections between the slits and microflow channels.

According to embodiment 8 of the invention, the liquid- or gas-distributing part (22) is constructed of three members (FIG. 10). The liquid- or gas-distributing part (22) is provided with an uppermost first member (22-1) comprising a dispersion phase supply port (6), situated below the part (12) with microgrooves (12-1), a second member (22-2) on the second level from the top that comprises a continuous phase supply port (7) and, in combination with the first member (22-1), forms an annular slit (3) for supply of the dispersion phase (1), and a third member (22-3) on the third level from the top that, in combination with the second member (22-2), forms an annular slit (4) for supply of the continuous phase (2) and comprises a center cylindrical hole for product discharge (5-1) and a discharge port (8) (FIG. 10). FIG. 10(a) shows a cross-sectional perspective view where the first to third members of the liquid- or gas-distributing part (22) are combined. The dispersion phase (1) and continuous phase (2) that are supplied flow from the lower layer through the annular slits (3, 4), and are supplied to the top of the liquid- or gas-distributing part (22). That is, the dispersion phase (1) is supplied from the dispersion phase supply port (6) of the first member (22-1) into the annular slit for dispersion phase-supply (3), the continuous phase (2) is supplied from the continuous phase supply port (7) of the second member into the annular slit for continuous phase-supply (4), and the continuous phase (2) and dispersion phase (1) are each delivered upward in the respective slits.

FIG. 10(b) shows the liquid- or gas-distributing part (22) having the two slits (i.e. the continuous phase supply slit (4) and the dispersion phase supply slit (3)) and the cylindrical hole (5-1), joined with the part (12) with microgrooves (12-1). In FIG. 10(b), the dispersion phase (1) is supplied to the outer annular slit (3) and the continuous phase (2) is supplied to the inner slit (4), the dispersion phase (1) being supplied to the microflow channels (9) formed by the microgrooves (12-1), and the product produced at the site of connection between the continuous phase supply slit (4) and the microflow channels (9) is discharged through the microflow channels (9) from the center cylindrical hole for discharge (5-1). FIG. 10(c) shows the state where a droplet or air bubble is produced inside the device. At the site of connection between the continuous phase supply slit (4) and the microflow channels (9), the dispersion phase (1) is subjected to shear by the flow of the continuous phase (2), forming droplets or air bubbles. The product is discharged through the cylindrical hole for discharge (5-1) from the discharge port (8).

Figure 11:
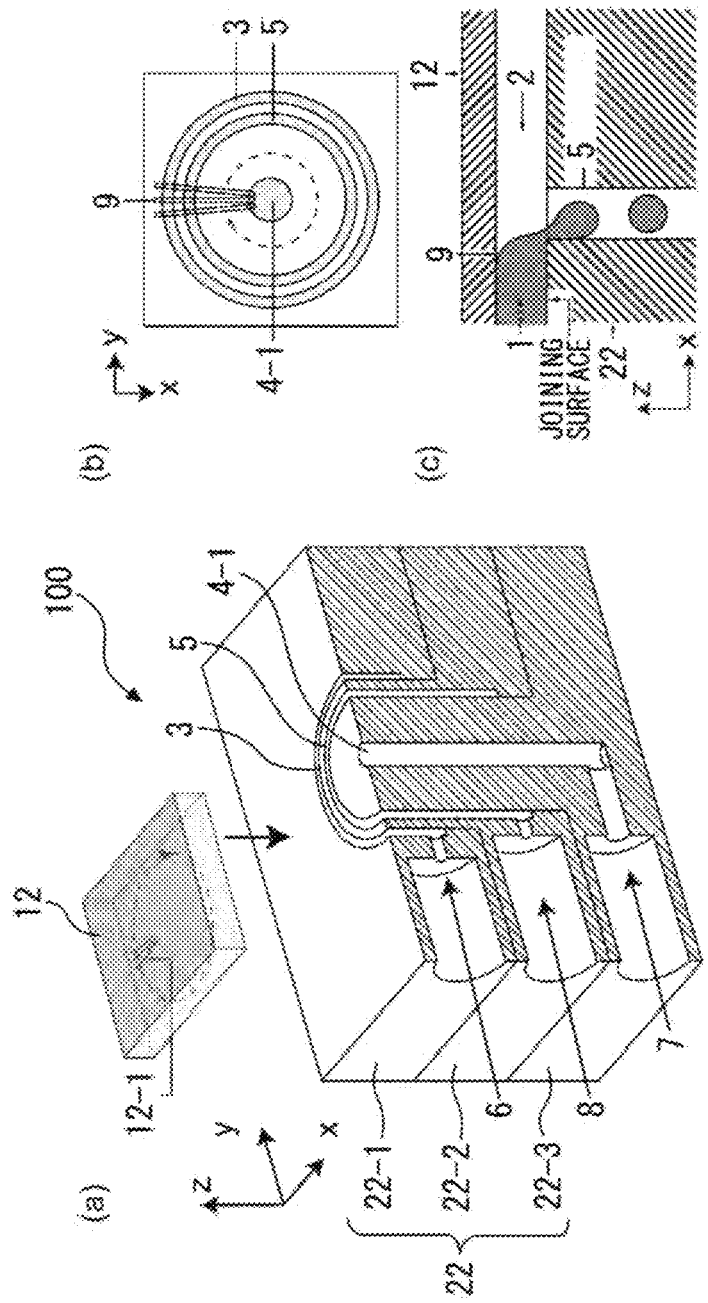
FIG. 11 is a diagram showing one embodiment of the microdroplet/bubble-producing device of the invention, (a) being a cross-sectional view of an annular liquid distributing device after assembly of three members, (b) being a top view after the part with microgrooves and the liquid distributing device have been joined, and (c) showing the state where droplets are produced at the intersections between the slits and microflow channels.

According to embodiment 9 of the invention, the liquid- or gas-distributing part (22) is constructed of three members (FIG. 11). The liquid- or gas-distributing part (22) is provided with an uppermost first member (22-1) comprising a dispersion phase supply port (6), situated below the part (12) with microgrooves (12-1), a second member (22-2) on the second level from the top that comprises a discharge port (8) and, in combination with the first member, forms an annular slit (3) for supply of the dispersion phase (1), and a third member (22-3) on the third level from the top that, in combination with the second member (22-2), forms an annular slit (5) for discharge of droplets or gas and comprises a center cylindrical hole for continuous phase-supply (4-1) and a continuous phase supply port (7). FIG. 11(a) shows a cross-sectional perspective view where the first to third members of the liquid- or gas-distributing part (22) are combined. The dispersion phase (1) and continuous phase (2) that are supplied flow from the lower layer through the annular slit (3) and cylindrical hole (4-1), and are supplied to the top of the liquid- or gas-distributing part (22). That is, the dispersion phase (1) is supplied from the dispersion phase supply port (6) of the first member (22-1) into the annular slit for dispersion phase-supply (3), the continuous phase (2) is supplied from the continuous phase supply port (7) of the third member (22-3) into the cylindrical hole for continuous phase-supply (4-1), the dispersion phase (1) being delivered upward in the slit and the continuous phase (2) being delivered upward in the cylindrical hole.

FIG. 11(b) shows the liquid- or gas-distributing part (22) having the two slits (i.e. the dispersion phase supply slit (3) and the product discharge annular slit (5)) and the continuous phase-supply cylindrical hole (4-1), joined with the part (12) with microgrooves (12-1). In FIG. 11(b), the dispersion phase (1) is supplied to the outer annular slit (3) and the continuous phase (2) is supplied to the center cylindrical hole (4-1), the dispersion phase (1) and continuous phase (2) being supplied to the microflow channels (9) formed by the microgrooves (12-1), and the product produced at the site of connection between the discharge slit (5) and the microflow channels (9) is discharged from the inner annular slit (5). FIG. 11(c) shows the state where a droplet or air bubble is produced inside the device. At the site of connection between the discharge slit (5) and the microflow channels (9), the dispersion phase (1) is subjected to shear by the flow of the continuous phase (2), forming droplets or air bubbles. The product is discharged through the discharge slit (5) from the discharge port (8).

Figure 12:
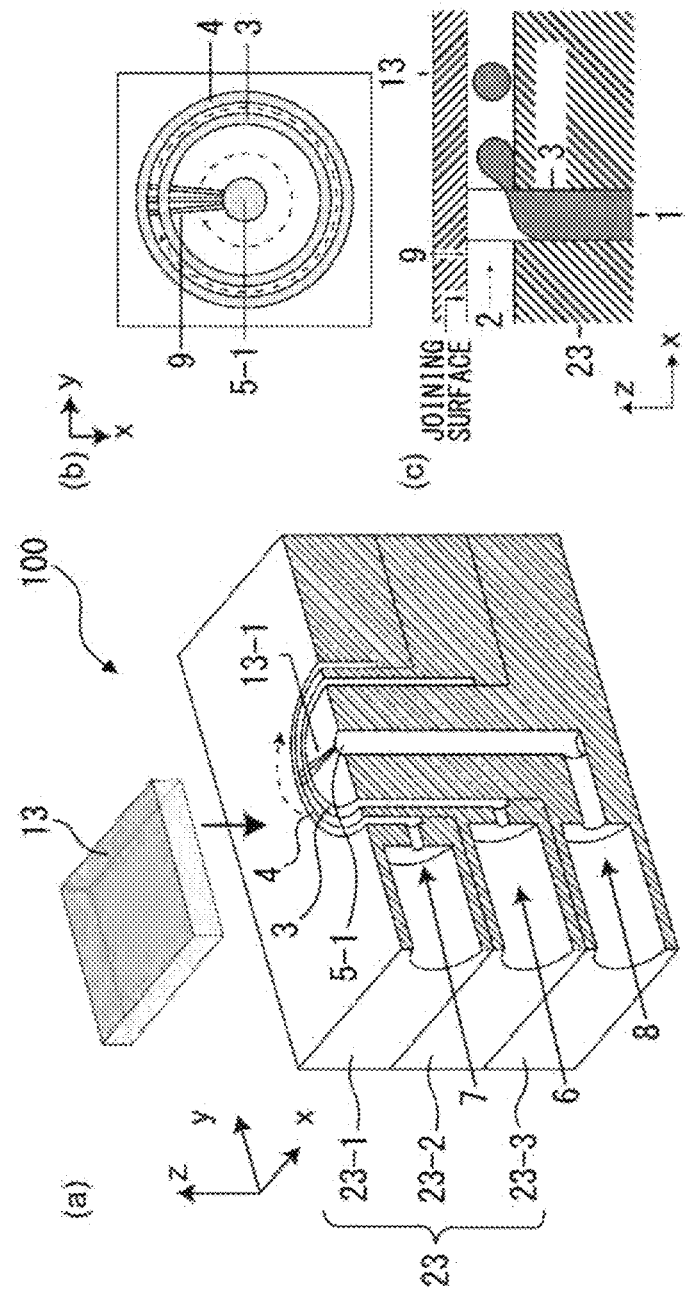
FIG. 12 is a diagram showing one embodiment of the microdroplet/bubble-producing device of the invention, (a) being a cross-sectional view of an annular liquid distributing device after assembly of three members, (b) being a top view after a cover has been joined to a liquid distributing device formed with the microgrooves, and (c) showing the state where droplets are produced at the intersections between the slits and microflow channels.

According to embodiment 10 of the invention, the liquid- or gas-distributing part (22) is constructed of three members (FIG. 12). The liquid- or gas-distributing part (22) is provided with an uppermost first member (23-1) comprising a continuous phase supply port (7), situated below a flat plate cover (13) for sealing of the slits (3, 4), cylindrical hole (5-1) and microgrooves (13-1), a second member (23-2) on the second level from the top that comprises a dispersion phase supply port (6) and, in combination with the first member (23-1), forms an annular slit (4) for supply of the continuous phase (2), and a third member (23-3) on the third level from the top that, in combination with the second member (23-2), forms an annular slit (3) for supply of the dispersion phase (1) and comprises a cylindrical hole for product discharge (5-1) at the center. Microgrooves (13-1) are formed between the annular slits (4, 3) formed by combination with the three members (23-3), and between the annular slit (5) and cylindrical hole (5-1). FIG. 12(a) shows a cross-sectional perspective view where the first to third members of the liquid- or gas-distributing part (22) are combined. The dispersion phase (1) and continuous phase (2) that are supplied flow from the lower layer through the annular slits (3, 4), and are supplied to the top of the liquid- or gas-distributing part (22). That is, the dispersion phase (1) is supplied from the dispersion phase supply port (6) of the second member (23-2) into the annular slit for dispersion phase-supply (3), the continuous phase (2) is supplied from the continuous phase supply port (7) of the first member (23-1) into the annular slit for continuous phase-supply (4), and the continuous phase (2) and dispersion phase (1) are each delivered upward in the respective slits (3, 4).

FIG. 12(b) shows the liquid- or gas-distributing part (22) having the two slits (i.e. the continuous phase supply slit (4) and the dispersion phase supply slit (3)), the discharge cylindrical hole (5-1) and the microgrooves (13-1), joined with the sealing flat plate cover (13). In FIG. 12(b), the continuous phase (2) is supplied to the outer annular slit (4) and the dispersion phase (1) is supplied to the inner slit (3), the continuous phase (2) being supplied to the microflow channels (9) formed by the microgrooves (13-1), and the product produced at the site of connection between the dispersion phase supply slit (3) and the microflow channels (9) is recovered through the microflow channels (9) from the center discharge cylindrical hole (5-1). FIG. 12(c) shows the state where a droplet or air bubble is produced inside the device. At the site of connection between the dispersion phase supply slit (3) and the microflow channels (9), the dispersion phase (1) is subjected to shear by the flow of the continuous phase (2), forming droplets or air bubbles. The product is discharged through the cylindrical hole for discharge (5-1) from the discharge port (8).

Figure 13:
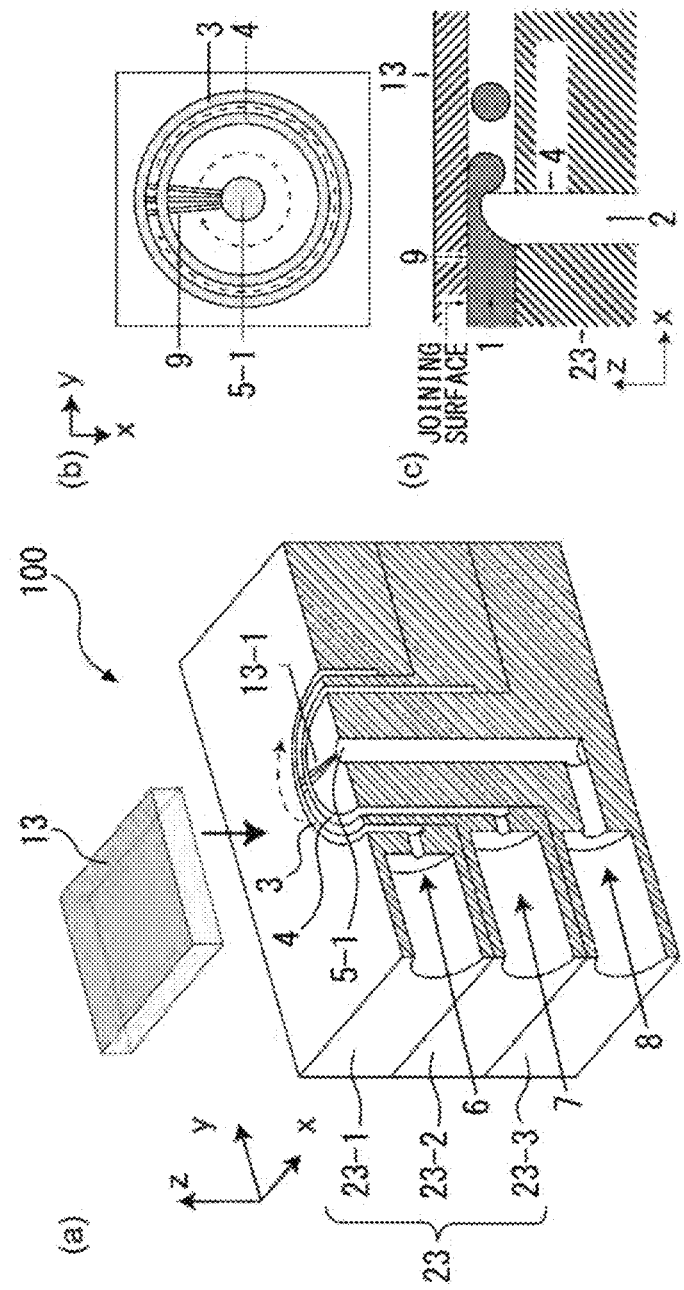
FIG. 13 is a diagram showing one embodiment of the microdroplet/bubble-producing device of the invention, (a) being a cross-sectional view of an annular liquid distributing device after assembly of three members, (b) being a top view after a cover has been joined to a liquid distributing device formed with the microgrooves, and (c) showing the state where droplets are produced at the intersections between the slits and microflow channels.

According to embodiment 11 of the invention, the liquid- or gas-distributing part (22) is constructed of three members (FIG. 13). The liquid- or gas-distributing part (22) is provided with an uppermost first member (23-1) comprising a dispersion phase supply port (6), situated below a flat plate cover (13) for sealing of the slits (3, 4), discharge cylindrical hole (5-1) and microgrooves (13-1), a second member (23-2) on the second level from the top that comprises a continuous phase supply port (7) and, in combination with the first member (23-1), forms an annular slit (3) for supply of the dispersion phase (1), and a third member (23-3) on the third level from the top that, in combination with the second member (23-2), forms an annular slit (4) for supply of the continuous phase (2) and comprises a cylindrical hole for discharge (5-1) at the center. Microgrooves are formed between the annular slits formed by combination with the three members, and between the annular slits (3, 4) and cylindrical hole (5-1). FIG. 13(a) shows a cross-sectional perspective view where the first to third members of the liquid- or gas-distributing part (22) are combined. The dispersion phase (1) and continuous phase (2) that are supplied flow from the lower layer through the annular slits (3, 4), and are supplied to the top of the liquid- or gas-distributing part (22). That is, the dispersion phase (1) is supplied from the dispersion phase supply port (6) of the first member (23-1) into the annular slit for dispersion phase-supply (3), the continuous phase (2) is supplied from the continuous phase supply port (7) of the second member into the annular slit for continuous phase-supply (4), and the continuous phase (2) and dispersion phase (1) are each delivered upward in the respective slits.

FIG. 13(b) shows the liquid- or gas-distributing part (22) having the two slits (i.e. the continuous phase supply slit (4) and the dispersion phase supply slit (3)), the discharge cylindrical hole (5-1) and the microgrooves (13-1), joined with the sealing flat plate cover (13). In FIG. 13(b), the dispersion phase (1) is supplied to the outer annular slit (3) and the continuous phase (2) is supplied to the inner slit (4), the dispersion phase (1) being supplied to the microflow channels (9) formed by the microgrooves (13-1), and the product produced at the site of connection between the continuous phase supply slit (4) and the microflow channels (9) is discharged through the microflow channels (9) from the center cylindrical hole for discharge (5-1). FIG. 13(c) shows the state where a droplet or air bubble is produced inside the device. At the site of connection between the slit for continuous phase supply (4) and the microflow channels (9), the dispersion phase (1) is subjected to shear by the flow of the continuous phase (2), forming droplets or air bubbles. The product is discharged through the cylindrical hole for discharge (5-1) from the discharge port (8).

Figure 14:
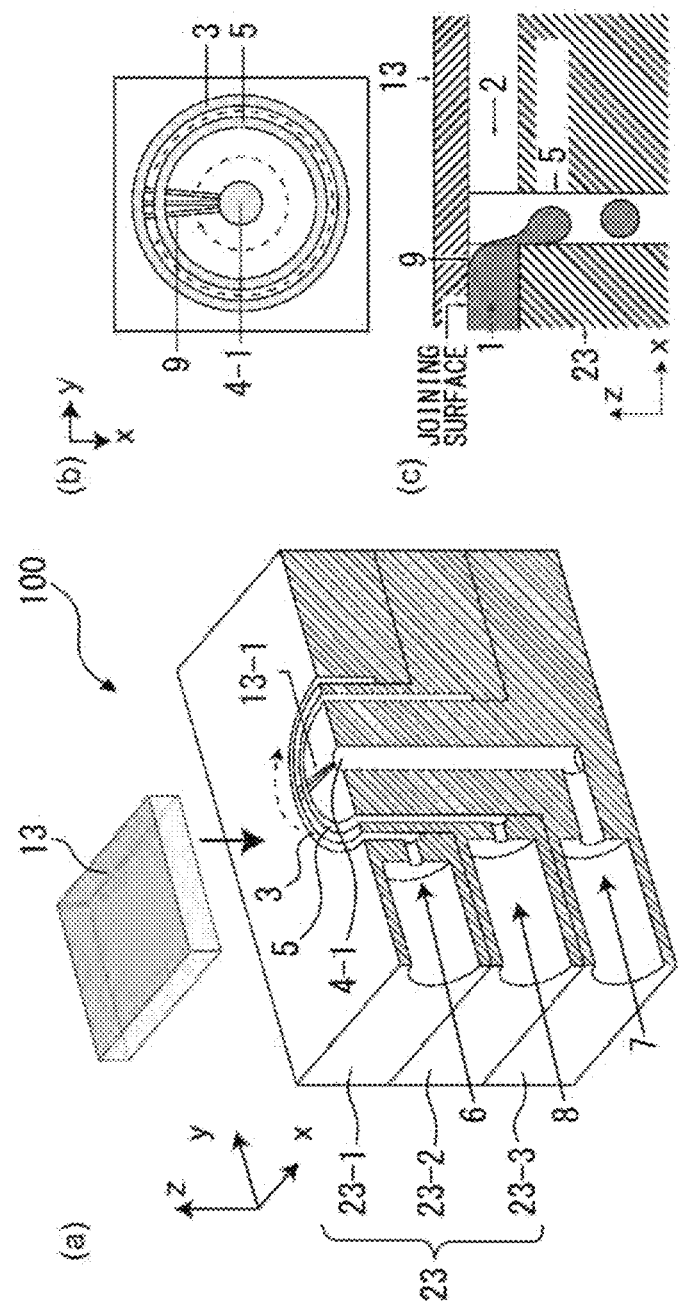
FIG. 14 is a diagram showing one embodiment of the microdroplet/bubble-producing device of the invention, (a) being a cross-sectional view of an annular liquid distributing device after assembly of three members, (b) being a top view after a cover has been joined to a liquid distributing device formed with the microgrooves, and (c) showing the state where droplets are produced at the intersections between the slits and microflow channels.

According to embodiment 12 of the invention, the liquid- or gas-distributing part (22) is constructed of three members (FIG. 14). The liquid- or gas-distributing part (22) is provided with an uppermost first member (23-1) comprising a dispersion phase supply port (6), situated below a flat plate cover (13) for sealing of the slits (3, 4), cylindrical hole (4-1) and microgrooves (13-1), a second member (23-2) on the second level from the top that comprises a discharge port (8) and, in combination with the first member (23-1), forms an annular slit (3) for supply of the dispersion phase (1), and a third member (23-3) on the third level from the top that, in combination with the second member (23-2), forms an annular slit (5) for discharge of droplets or air bubbles and comprises a cylindrical hole (4-1) at the center for supply of the continuous phase. Microgrooves (13-1) are formed between the annular slits (3, 5) formed by combination of the three members, and between the annular slit (5) and cylindrical hole (4-1). FIG. 14(a) shows a cross-sectional perspective view where the first to third members of the liquid-distributing part (22) are combined. The dispersion phase (1) that is supplied flows from the lower layer through the annular slit (3) while the continuous phase (2) flows through the cylindrical hole (4-1) for supply of the continuous phase at the center, and they are supplied to the top of the liquid- or gas-distributing part (22). That is, the dispersion phase (1) is supplied from the dispersion phase supply port (6) of the first member (23-1) into the annular slit for dispersion phase-supply (3), the continuous phase (2) is supplied from the continuous phase supply port (7) of the third member into the cylindrical hole for continuous phase-supply (4-1), the dispersion phase (1) being delivered upward in the slit and the continuous phase (2) being delivered upward in the cylinder.

FIG. 14(b) shows the liquid- or gas-distributing part (22) having the two slits (i.e. the annular slit (5) for discharge of droplets or air bubbles and the dispersion phase supply slit (3)) and the cylindrical hole for continuous phase-supply (4-1), joined with the sealing flat plate cover (13). In FIG. 14(b), the dispersion phase (1) is supplied to the outer annular slit (3) and the continuous phase (2) is supplied to the center cylindrical hole (4-1), the dispersion phase (1) and continuous phase (2) being supplied to the microflow channels (9) formed by the microgrooves (13-1), and the product produced at the site of connection between the discharge slit (5) and the microflow channels (9) is discharged at the inner annular slit (5). FIG. 14(c) shows the state where a droplet (or air bubble) is produced inside the device. At the site of connection between the discharge slit (5) and the microflow channels (9), the dispersion phase (1) is subjected to shear by the flow of the continuous phase (2), forming droplets or air bubbles. The product is discharged through the discharge annular slit (5) from the discharge port (8).

Figure 15:
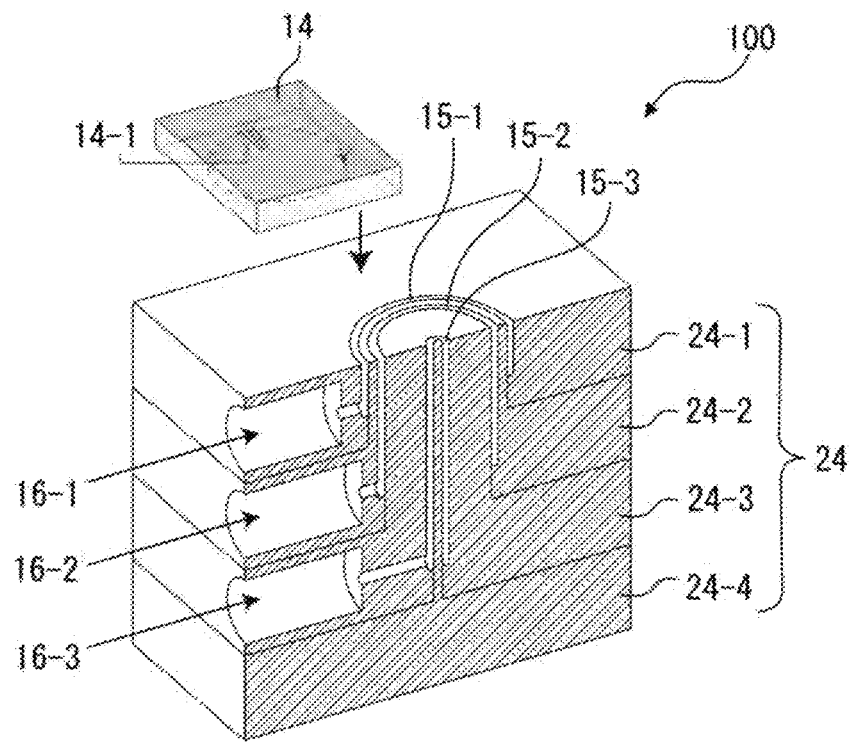
FIG. 15 shows one embodiment of the microdroplet/bubble-producing device of the invention, as a cross-sectional view of an annular liquid distributing device after assembly of four members (joining of the liquid distributing device with a part having microgrooves).

For embodiment 13 of the invention, the liquid- or gas-distributing device (100) may be constructed using four members as of the device of embodiments 7 to 9, as shown in FIG. 15, wherein the center cylindrical hole is changed as the annular slit (15-3), and a part with microgrooves (microgroove array panel) (14) may be attached to allow formation of droplets or air bubbles in the same manner. Here, 14 is a part with microgrooves (14-1), 15-1 and 15-2 are annular slits, 16-1, 16-2 and 16-3 are supply ports or discharge ports, and 24-1, 24-2, 24-3 and 24-5 are members forming the liquid- or gas-distributing part (24).

Figure 16:
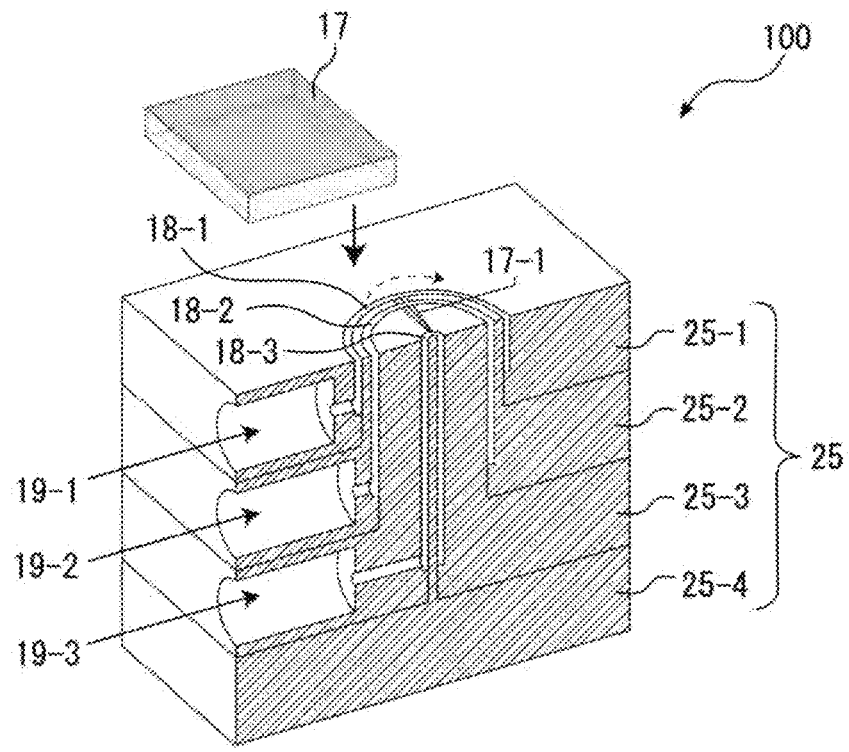
FIG. 16 shows one embodiment of the microdroplet/bubble-producing device of the invention, as a cross-sectional view of an annular liquid distributing device after assembly of four members (joining of the cover with the liquid distributing device formed with the microgrooves).

For embodiment 14 of the invention, the liquid- or gas-distributing device (100) may be constructed using four members as of the device of embodiments 10 to 12, as shown in FIG. 16, wherein the center cylindrical hole is changed as the annular slit (17-3), and a sealing panel may be attached to allow formation of droplets or air bubbles in the same manner. Here, 17 is the sealing cover, 16-1 and 16-2 are annular slits, 18-1, 18-2 and 18-3 are supply ports or discharge ports, and 25-1, 25-2, 25-3 and 25-5 are members forming the liquid- or gas-distributing part (24).

EXAMPLES

The invention will now be explained in greater detail by the following examples.

Example 1

A droplet-producing device (FIG. 1) constructed of a microflow channel panel with paralleled straight linear microflow channels having a rectangular cross-sectional shape (microgroove array panel) (10) and a liquid- or gas-distributing part (20) was designed and fabricated. The microflow channel panel comprised 125 linear microflow channels having rectangular cross-sections (100 µm width, 110 µm height, 1.4 mm length), and the gaps between the flow channels were 100 µm (FIG. 1(*a*)). The liquid distributing device was constructed of a stack of four members each with a width of 24 mm, a length of 40 mm and a height of 8 mm (FIG. 1(*b*)). The uppermost section member had a total of 3 slits which were a continuous phase supply slit (4), a dispersion phase supply slit (3) and a product discharge (liquid recovery) slit (5), and a discharge port (8) on the side, connected to the product discharge (liquid recovery) slit (5). Each slit had a width of 100 µm and a length of 27 mm, and the gaps between the slits were 500 µm (FIG. 1(*c*)). The member on the second level from the top had a continuous phase supply slit (4), a dispersion phase supply slit (3) and a continuous phase supply port (7) on the side connected to the continuous phase supply slit (4), and also served to seal the liquid recovery slit (5) of the member directly above it. The third member (20-3) on the third level from the top had a dispersion phase supply slit (3) and a dispersion phase supply port (6) on the side connected to the dispersion phase supply slit (3), and also served to seal the continuous phase supply slit (4) of the member directly above it. The lowermost member sealed the dispersion phase supply slit (3) of the member directly above it. FIG. 1(*c*) shows a cross-sectional view where the four members of the liquid- or gas-distinguish member (20) are combined. The dispersion phase (1) and continuous phase (2) that are supplied flow from the lower layer through the slit flow channels and are supplied to the top of the distributing device.

FIG. 1(*d*) shows a conceptual view from above the device, where the microflow channel panel is positioned onto the 3 slits of a liquid- or gas/liquid-distributing part (20), and joined. The dispersion phase (1) is supplied to the center slit flow channel (3), and the continuous phase (2) is supplied to the upper slit flow channel (4), and the product is recovered at the lower slit flow channel (5). FIG. 1(*e*) is a conceptual drawing showing the state where droplets are produced in the microflow channel.

The microflow channel panel was fabricated by transfer of a pattern from a die with a height of 110 µm produced using SU-8 (Nippon Kayaku Co., Ltd.), which is a negative-type photoresist on a Si panel, to polydimethylsiloxane (PDMS). Silpot184 (Dow Corning Toray) was used as the PDMS starting material. The four members of the liquid-distributing part (20) were fabricated by machining a stainless steel material (SUS304). The slit-shaped through-holes of the liquid-distributing part (20) were formed by wire electrical discharge machining. In order to prevent fluid leakage from the bonding surfaces between the members of the liquid-distributing device during supply of the continuous phase and dispersion phase to the flow channel distributing device, PDMS was coated onto the bonding surfaces and heated at 120° C. to hardening.

The introduced samples used were corn oil (Wako Pure Chemical Industries, Ltd.) containing a surfactant (SY-Glyster CRS-75 by Sakamoto Yakuhin Kogyo Co., Ltd., 1 wt %) as the continuous phase, and purified water as the dispersion phase. A 10 ml glass syringe (1000 series, Hamilton Company, USA) and a syringe pump (KDS200, KD Scientific, USA) were used for delivery into the liquid-distributing device. An upright microscope (BX-51, Olympus Corp.) and a high-speed video camera (Fastcam-1024PCI, Photron) were used in combination for observation of the state of droplet formation in the microflow channels.

Figure 17:
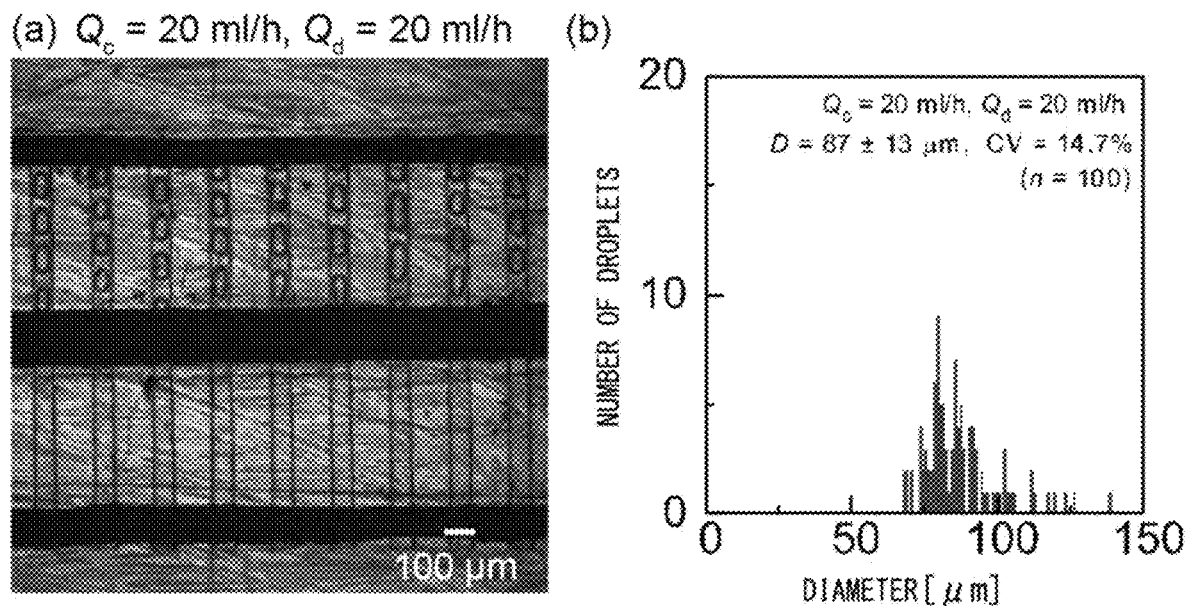
FIG. 17 shows (a) the state of droplet formation and (b) the size distribution of the produced droplets for Example 1 (continuous phase flow rate ($Q_c$)=20 mL/h, dispersion phase flow rate ($Q_d$)=20 mL/h).

FIG. 17(*a*) shows the state of W/O droplet formation in a paralleled microflow channel, with the continuous phase flow rate ($Q_c$) set to 20 mL/h and the dispersion phase flow rate ($Q_d$) set to 20 mL/h. Formation of W/O droplets was observed at the locations where the microflow channels and dispersion phase supply slit were connected. The number of droplets produced per second per microflow channel near the slit centers was 33.3. The mean diameter of the produced droplets was 87 µm and the coefficient of variation (CV) was 14.7% (FIG. 17(*b*)).

Example 2

Figure 18:
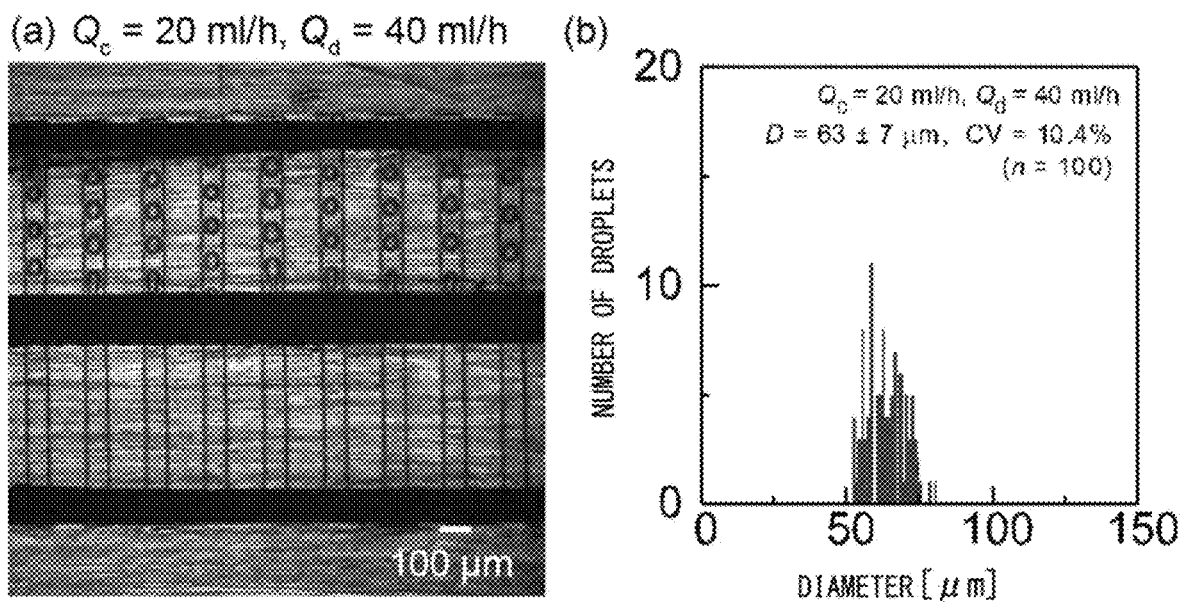
FIG. 18 shows (a) the state of droplet formation and (b) the size distribution of the produced droplets for Example 2 (continuous phase flow rate ($Q_c$)=20 mL/h, dispersion phase flow rate ($Q_d$)=40 mL/h).

The same test apparatus as in Example 1 was used for a test under the same conditions as in Example 1, except that the dispersion phase flow rate was 40 mL/h. FIG. 18 shows the state of W/O droplet formation at the center sections of the slits and the produced droplet size distribution. The mean diameter of the obtained droplets was 63 µm, and the coefficient of variation was 10.4%.

Example 3

Figure 19:
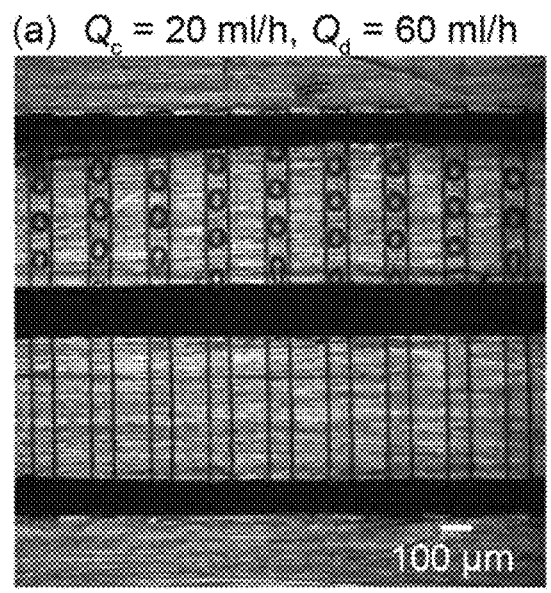
FIG. 19 shows (a) the state of droplet formation and (b) the size distribution of the produced droplets for Example 3 (continuous phase flow rate ($Q_c$)=20 mL/h, dispersion phase flow rate ($Q_d$)=60 mL/h).
Figure 19:
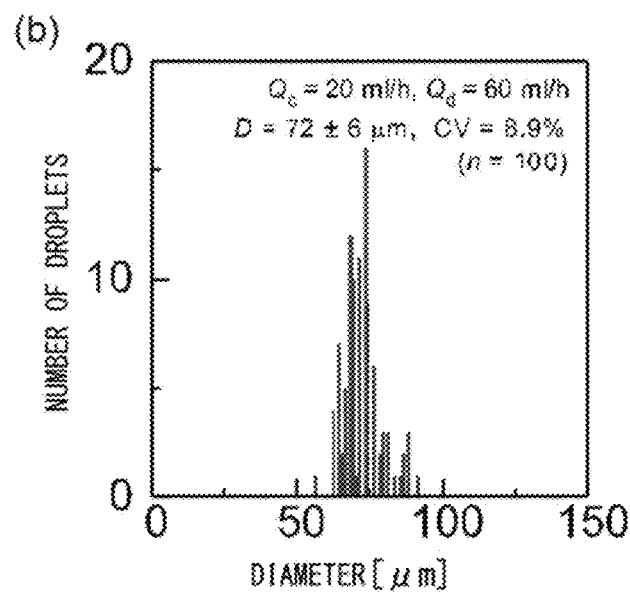

The same test apparatus as in Example 1 was used for a test under the same conditions as in Example 1, except that the dispersion phase flow rate was 60 mL/h. FIG. 19 shows the state of W/O droplet formation at the center sections of the slits and the produced droplet size distribution. The mean diameter of the obtained droplets was 72 µm, and the coefficient of variation was 8.9%.

Example 4

Figure 20:
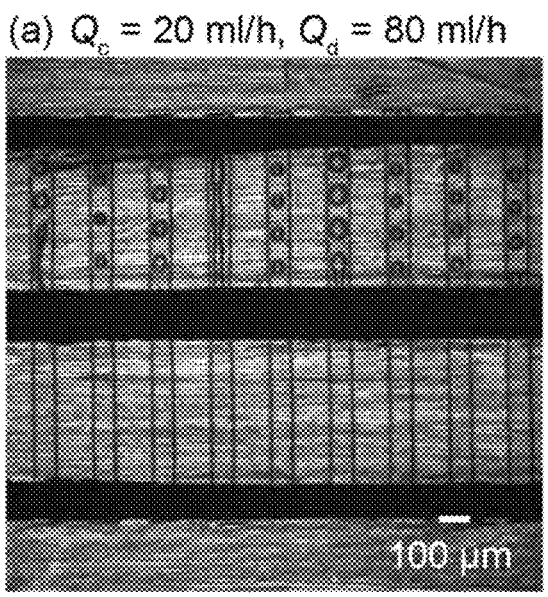
FIG. 20 shows (a) the state of droplet formation and (b) the size distribution of the produced droplets for Example 4 (continuous phase flow rate ($Q_c$)=20 mL/h, dispersion phase flow rate ($Q_d$)=80 mL/h).
Figure 20:
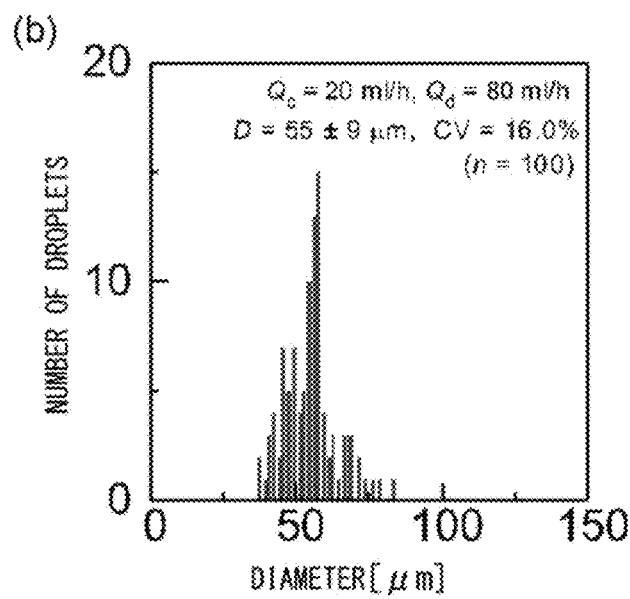

The same test apparatus as in Example 1 was used for a test under the same conditions as in Example 1, except that the dispersion phase flow rate was 80 mL/h. FIG. 20 shows the state of W/O droplet formation at the center sections of the slits and the produced droplet size distribution. The mean diameter of the obtained droplets was 55 µm, and the coefficient of variation was 16.0%.

Example 5

Figure 21:
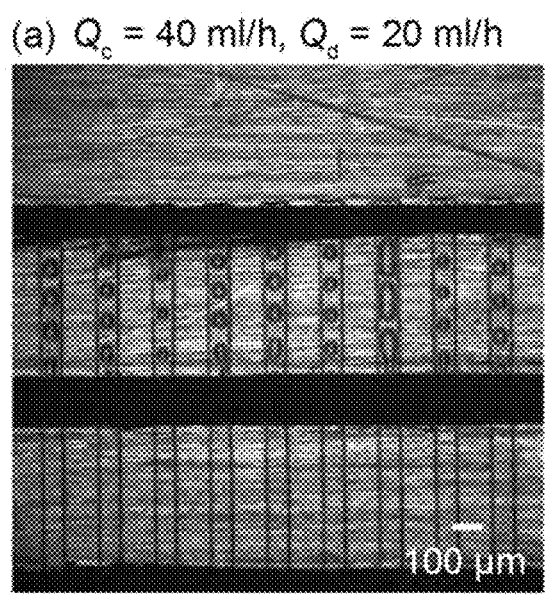
FIG. 21 shows (a) the state of droplet formation and (b) the size distribution of the produced droplets for Example 5 (continuous phase flow rate ($Q_c$)=40 mL/h, dispersion phase flow rate ($Q_d$)=20 mL/h).
Figure 21:
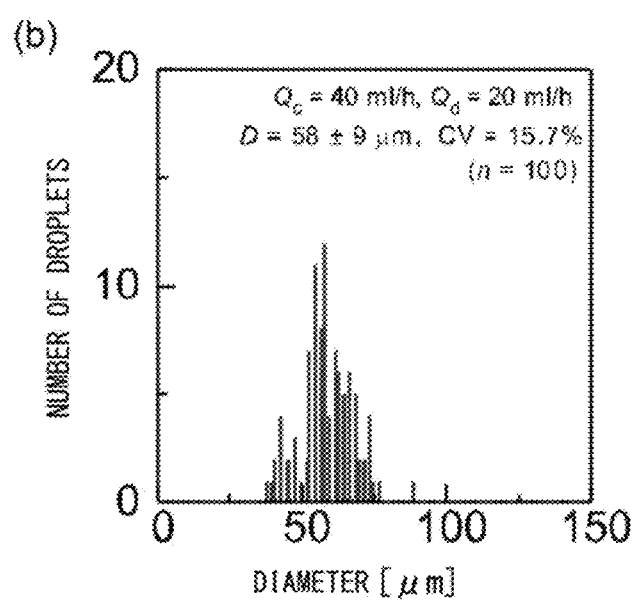

The same test apparatus as in Example 1 was used for a test under the same conditions as in Example 1, except that the continuous phase flow rate was 40 mL/h. FIG. 21 shows the state of W/O droplet formation at the center sections of the slits and the produced droplet size distribution. The mean diameter of the obtained droplets was 58 µm, and the coefficient of variation was 15.7%.

Example 6

Figure 22:
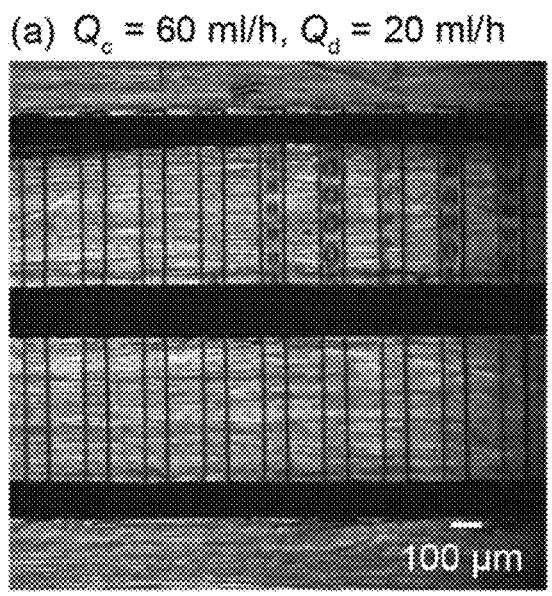
FIG. 22 shows (a) the state of droplet formation and (b) the size distribution of the produced droplets for Example 6 (continuous phase flow rate ($Q_c$)=60 mL/h, dispersion phase flow rate ($Q_d$)=20 mL/h).
Figure 22:
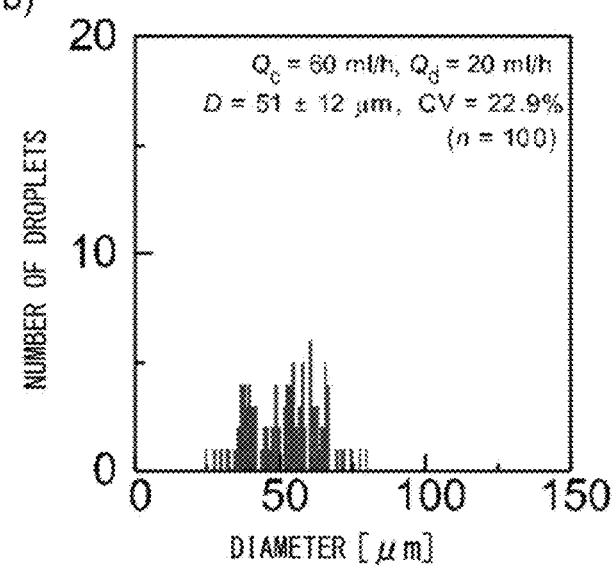

The same test apparatus as in Example 1 was used for a test under the same conditions as in Example 1, except that the continuous phase flow rate was 60 mL/h. FIG. 22 shows the state of W/O droplet formation at the center sections of the slits and the produced droplet size distribution. The mean diameter of the obtained droplets was 51 µm, and the coefficient of variation was 22.9%.

Example 7 (Matrix-Type Device)

A test was conducted under the same conditions as Example 1 using the same type of test apparatus as in Example 1, except that the sizes of the 125 straight linear microgrooves on the microgroove array panel were a width of 100 µm, a height of 50 µm and a length of 1.4 mm, the dispersion phase flow rate was 10 mL/h and the continuous phase flow rate was 10 mL/h.

Figure 23:
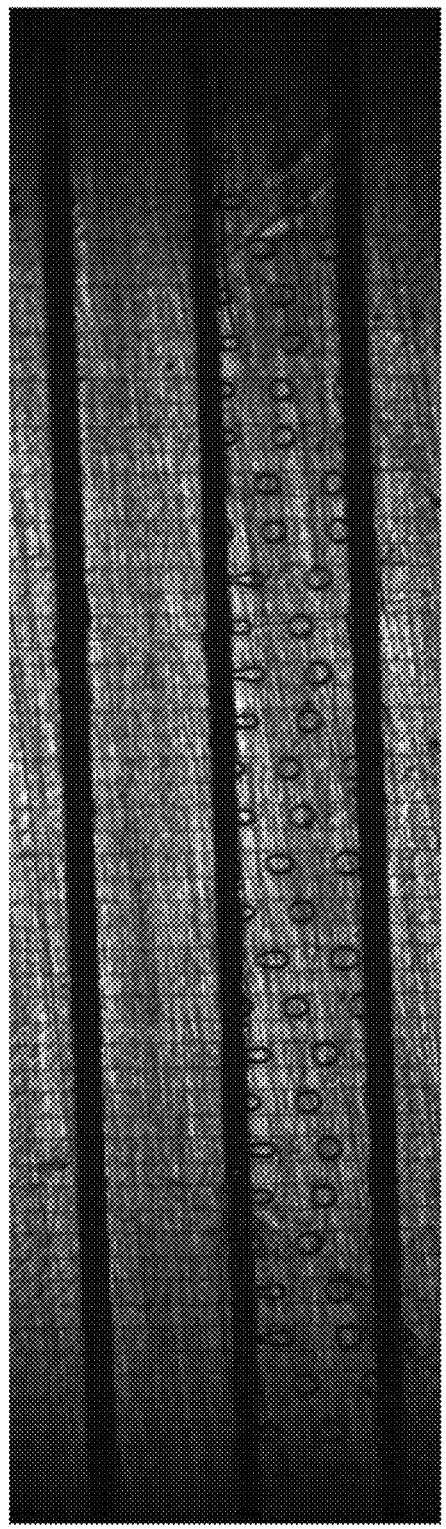
FIG. 23 shows the state of W/O droplet formation for Example 7.
Figure 24:
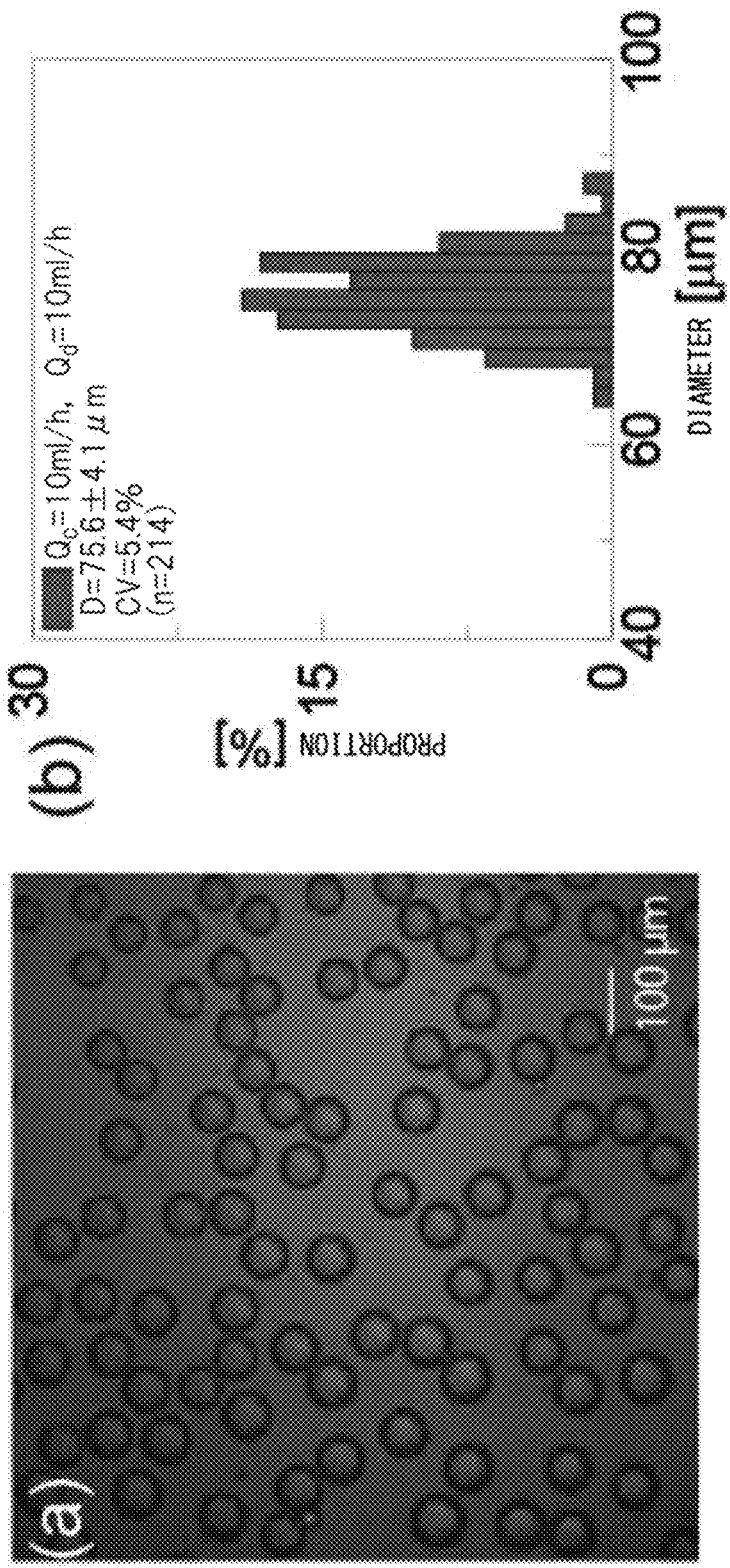
FIG. 24 shows a photograph of W/O droplets produced in Example 7, taken from outside the device (a), and their size distribution (b).

FIG. 23 shows the state of W/O droplet formation at the center sections of the slits. FIG. 24(a) shows a photograph of the produced W/O droplets, taken from outside the device, and FIG. 24(b) shows their size distribution. The mean diameter of the obtained droplets was 76 µm, and the coefficient of variation was 5.4%.

Example 8 (Annular Device)

A droplet-producing device (100) was designed and fabricated comprising a microgroove array panel (12) having a plurality of microgrooves (12-1) with rectangular cross-sectional shapes configured in a radial fashion, and a liquid-distributing part (22) having annular slits (3, 4) (FIG. 9). The microgroove array panel (12) comprised 100 straight linear microgrooves (12-1) having rectangular cross-sectional shapes (100 µm width, 100 µm depth and 3.2 mm length) configured in a radial fashion, the angles between the adjacent microgrooves being 3.6°. The liquid-distributing part (22) was constructed by stacking and fitting together three members (22-1, 22-2, 22-3) (FIG. 9(a)). The uppermost section member (22-1) had a continuous phase supply port (7) on the side, the middle member (22-2) had a dispersion phase supply port (6) on the side, and the lowermost member (22-3) had a discharge port (8) connected from the cylindrical hole at the center top to the side. An annular continuous phase supply slit (3) with a diameter of 13.5 mm and a width of 500 µm was formed by combining the uppermost section member (22-1) and the middle member (22-2), and an annular dispersion phase supply slit (3) with a diameter of 10.5 mm and a width of 500 µm was formed by combining the middle member (22-2) with the lowermost member (22-3). FIG. 9(b) shows a conceptual drawing of a configuration in which the microgroove array panel (12) are positioned matching the two annular slits (3, 4) and the center discharge port of the liquid-distributing part (22), as seen from above the device. The dispersion phase and continuous phase that are supplied flow through the annular slit flow channels and are supplied to the top of the liquid-distributing device. FIG. 9(c) is a conceptual drawing showing the state where droplets are produced in a microflow channel.

The microgroove array panel (12) was fabricated by transferring a pattern from a die with a height of 100 µm produced using SU-8, to PDMS in the same manner as Example 1. The three members of the liquid-distributing part (22) were fabricated by machining a stainless steel material (SUS304). A PTFE backup ring was used while supplying the continuous phase and dispersion phase to the liquid-distributing device, to prevent fluid leakage from the contact surface between the members of the liquid-distributing device.

The introduced samples used were the same as in Example 1. The same devices as in Example 1 were also used to deliver the liquids into the liquid-distributing device and to observe droplet formation in the microflow channels.

Figure 25:
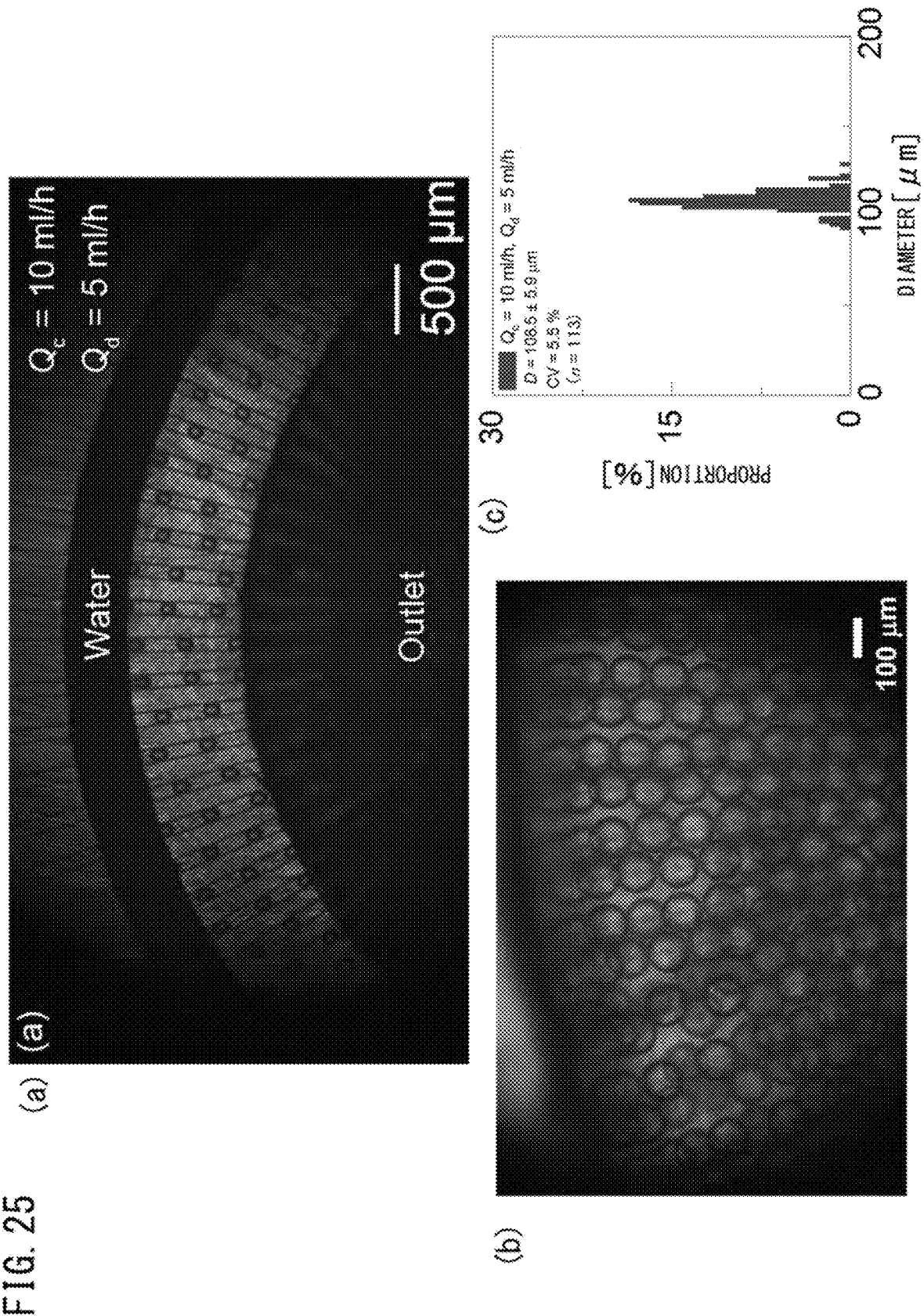
FIG. 25(a) shows the state of W/O droplet formation in the microflow channels in Example 8 (continuous phase flow rate ($Q_c$)=10 mL/h, dispersion phase flow rate ($Q_d$)=5 mL/h). (b) shows the state of W/O droplets produced at the bonded sites of the microflow channels and dispersion phase supply slits, as observed flowing into the center discharge port. (c) shows the mean diameter of the produced droplets and the coefficient of variation (CV).

FIG. 25(a) shows the state of W/O droplet formation in microflow channels, with the continuous phase flow rate ($Q_c$) set to 10 mL/h and the dispersion phase flow rate ($Q_d$) set to 5 mL/h. The state of W/O droplets produced at the bonded sites of the microflow channels and dispersion phase supply slits and their flow into the center discharge port, were observed (FIG. 25(b)). The mean diameter of the produced droplets was 109 µm and the coefficient of variation (CV) was 5.5% (FIG. 25(c)).

INDUSTRIAL APPLICABILITY

According to the invention, it is possible to provide a microdroplet/bubble-producing device that does not require separate through-holes for different liquid droplet-producing flow channels, for connecting liquid-distributing flow channels and droplet-producing flow channels.

REFERENCE SIGNS LIST

1 Dispersion phase
2 Continuous phase
3 Dispersion phase supply slit
3-1 Cylindrical hole portion of dispersion phase supply port
4 Continuous phase supply slit
4-1 Cylindrical hole portion of continuous phase-supply port
5 (Microdroplet/air bubble) discharge slit
5-1 (Microdroplet/air bubble) Cylindrical hole portion of discharge port
6 Dispersion phase supply port
7 Continuous phase supply port
8 (Microdroplet/air bubble) Discharge port
9 Microflow channel
100 Distributing device (microdroplet/bubble-producing device)
10 Microgrooves array panel (microflow channel array)
10-1 Microgroove
11 Sealing cover
11-1 Microgroove
12 Part with microgrooves
12-1 Microgroove
13 Sealing cover
13-1 Microgroove
14 Part with microgrooves
14-1 Microgroove
15-1, 15-2 Slit
15-3 Annular slit
16-1, 16-2, 16-3 Supply port or discharge port
17 Sealing cover
17-1 Microgroove
18-1, 18-2 Slit
18-3 Annular slit
19-1, 19-2, 19-3 Supply port or discharge port
20 Liquid- or gas-distributing part
20-1 Component member forming liquid- or gas-distributing part (first member)
20-2 Component member of liquid- or gas-distributing part (second member)
20-3 Component member of liquid- or gas-distributing part (third member)
20-4 Component member of liquid- or gas-distributing part (fourth member)
21 Liquid- or gas-distributing part
21-1 Component member of liquid- or gas-distributing part (first member)
21-2 Component member of liquid- or gas-distributing part (second member)
21-3 Component member of liquid- or gas-distributing part (third member)
22 Liquid- or gas-distributing part 22-1 Component member of liquid- or gas-distributing part (first member)
22-2 Component member of liquid- or gas-distributing part (second member)
22-3 Component member of liquid- or gas-distributing part (third member)
23 Liquid- or gas-distributing part
23-1 Component member of liquid- or gas-distributing part (first member)
23-2 Component member of liquid- or gas-distributing part (second member)
23-3 Component member of liquid- or gas-distributing part (third member)

The invention claimed is:

1. A microdroplet/bubble-producing device comprising:
a row of a plurality of microflow channels on a reference plane,
a dispersion phase supply port for supplying a dispersion phase, the dispersion phase supply port having an end connected with the plurality of microflow channels,
a continuous phase supply port for supplying a continuous phase, the continuous phase supply port having an end connected with the plurality of microflow channels,
a discharge port for recovery of a product, the discharge port having an end connected with the plurality of microflow channels, and
a slit connected with the plurality of microflow channels at an end of the slit, the slit having a linear slit end face with a width and axis line having a larger dimension than the size of the width in the reference plane, the reference plane being the flat plane on which the row of the plurality of microflow channels exist, the linear slit end face of the slit being connected with the microflow channels in a transverse direction, the slit having the reference plane as its end and extending from the reference plane in the transverse direction of the reference plane,
the end of the slit being connected through each of the microflow channels with any two from among the end of the dispersion phase supply port, the end of the continuous phase supply port and the end of the discharge port,
the end of the slit being configured to be sandwiched along the axis line of each of the plurality of microflow channels, by said two from among the end of the dispersion phase supply port, the end of the continuous phase supply port and the end of the discharge port,
wherein the plurality of microflow channels are configured to transport one of the dispersion phase and continuous phase in the plurality of microflow channels from one of the sandwiching ports to the sites of connection between the sandwiched slit and the plurality of the microflow channels, while the sandwiched slit is configured to transport the other one of the dispersion phase and continuous phase to the sites of connection between the sandwiched slit and the plurality of the microflow channels, or the plurality of microflow channels are configured to transport both of the dispersion phase and continuous phase in the plurality of microflow channels from the sandwiching ports to the sites of connection between the sandwiched slit and the plurality of the microflow channels; and
wherein the sites of connection between the sandwiched slit and the microflow channels are configured to provide shearing of the dispersion phase by the flow of the continuous phase as the driving force, forming droplets or air bubbles of the dispersion phase in the continuous phase, the discharge port being configured for recovery of the product comprising the droplets or air bubbles of the dispersion phase in the continuous phase.

2. The microdroplet/bubble-producing device according to claim 1, wherein all of the end portions of the dispersion phase supply port, continuous phase supply port and discharge port that are joints with the plurality of microflow channels are slits.

3. The microdroplet/bubble-producing device according to claim 1, wherein one of the end portions of the dispersion phase supply port, continuous phase supply port and discharge port that are joints with the plurality of microflow channels is hole-shaped, and the other end portions are slits.

4. The microdroplet/bubble-producing device according to claim 1, wherein the slit is a tabular slit.

5. The microdroplet/bubble-producing device according to claim 2, wherein the slit is a tabular slit.

6. The microdroplet/bubble-producing device according to claim 1, wherein the slit is an annular slit.

7. The microdroplet/bubble-producing device according to claim 2, wherein the slit is an annular slit.

8. The microdroplet/bubble-producing device according to claim 1, which is constructed by aligning together a part comprising a plurality of slits and a flat part formed with a row of a plurality of microgrooves on the surface thereof, and attaching the face of the ends of the plurality of slits and the face of the flat part that is formed with the microgrooves.

9. The microdroplet/bubble-producing device according to claim 1, wherein a row of a plurality of microgrooves is formed on the surface of a part comprising a plurality of slits, and the microgrooves are sealed with a separate flat part, forming the row of the plurality of microflow channels.

10. The microdroplet/bubble-producing device according to claim 1, wherein the microflow channels have widths of 1 to 200 μm and heights of 1 to 200 μm.

11. The microdroplet/bubble-producing device according to claim 8, wherein the microflow channels have widths of 1 to 200 μm and heights of 1 to 200 μm.

12. The microdroplet/bubble-producing device according to claim 1, wherein the width of the end of the slit is 10 to 500 μm.

13. The microdroplet/bubble-producing device according to claim 8, wherein the widths of the ends of the slits are 10 to 500 μm.

14. The microbubble-producing device according to claim 1, wherein the dispersion phase is a gas phase and the continuous phase is a liquid phase.

15. The microbubble-producing device according to claim 8, wherein the dispersion phase is a gas phase and the continuous phase is a liquid phase.

16. The microdroplet-producing device according to claim 1, wherein the dispersion phase and the continuous phase are both liquid phases.

17. The microdroplet-producing device according to claim 8, wherein the dispersion phase and the continuous phase are both liquid phases.

18. The microdroplet-producing device according to claim 16, wherein the inner walls of the microflow channels are formed of hydrophobic surfaces, the dispersion phase is an aqueous phase and the continuous phase is an organic phase.

19. The microdroplet-producing device according to claim 17, wherein the inner walls of the microflow channels are formed of hydrophobic surfaces, the dispersion phase is an aqueous phase and the continuous phase is an organic phase.

20. The microdroplet-producing device according to claim 16, wherein the inner walls of the microflow channels are formed of hydrophilic surfaces, the dispersion phase is an organic phase and the continuous phase is an aqueous phase.

21. The microdroplet-producing device according to claim 17, wherein the inner walls of the microflow channels are formed of hydrophilic surfaces, the dispersion phase is an organic phase and the continuous phase is an aqueous phase.

22. A microdroplet/bubble-producing method using a microdroplet/bubble-producing device that comprises:
   a row of a plurality of microflow channels on a reference plane,
   a dispersion phase supply port for supplying a dispersion phase, the dispersion phase supply port having an end connected with the plurality of microflow channels,
   a continuous phase supply port for supplying a continuous phase, the dispersion phase supply port having an end connected with the plurality of microflow channels,
   a discharge port for recovery of a product, the discharge port having an end connected with the plurality of microflow channels, and
   a slit connected with the plurality of microflow channels at an end of the slit, the slit having a linear slit end face with a width and axis line having a larger dimension than the size of the width in the reference plane, the reference plane being the flat plane on which the row of the plurality of microflow channels exist, the linear slit end face of the slit being connected with the microflow channels in a transverse direction, the slit having the reference plane as its end and extending from the reference plane in the transverse direction of the reference plane,
   the end of the slit being connected through each of the microflow channels with any two from among the end of the dispersion phase supply port, the end of the continuous phase supply port and the end of the discharge port,
   the end of the slit being connected through each of the microflow channels with any two from among the end of the dispersion phase supply port, the end of the continuous phase supply port and the end of the discharge port,
   the end of the slit being configured to be sandwiched-along the axis line of each of the plurality of microflow channels, by said two from among the end of the dispersion phase supply port, the end of the continuous phase supply port and the end of the discharge port,
   the method comprising:
   supplying a dispersion phase to the dispersion phase supply port and a continuous phase to the continuous phase port;
   transporting the dispersion phase and the continuous phase through two from among the sandwiched slit and the sandwiching ports to the plurality of microflow channels;
   receiving and transporting one of the dispersion phase and continuous phase in the plurality of microflow channels from one of the sandwiching ports to the sites of connection between the sandwiched slit and the plurality of the microflow channels, and transporting the other one of the dispersion phase and continuous phase through the sandwiched slit to the sites of connection between the sandwiched slit and the plurality of microflow channels, or receiving and distributing both of the dispersion phase and continuous phase in the plurality of microflow channels from the sandwiching ports to the sites of connection between the sandwiched slit and the plurality of the microflow channels;
   meeting the dispersion phase and continuous phase at the sites of connection between the sandwiched slit and the microflow channels;
   providing shearing of the dispersion phase by the flow of the continuous phase as the driving force at the sites of connection between the sandwiched slit and the microflow channels;
   forming droplets or air bubbles of the dispersion phase in the continuous phase; and
   recovering of the product comprising the droplets or air bubbles of the dispersion phase in the continuous phase from the discharge port.

23. The microdroplet/bubble-producing method according to claim 22, wherein all of the end portions of the dispersion phase supply port, continuous phase supply port and discharge port that are joints with the plurality of microflow channels are slits.

24. The microdroplet/bubble-producing method according to claim 22, wherein one of the end portions of the dispersion phase supply port, continuous phase supply port and discharge port that are joints with the plurality of microflow channels is hole-shaped, and the other end portions are slits.

25. The microdroplet/bubble-producing method according to claim 22, wherein the slit is a tabular slit.

26. The microdroplet/bubble-producing method according to claim 22, wherein the slit is an annular slit.

27. The microdroplet/bubble-producing method according to claim 22, wherein the sizes of the microflow channels have widths of 1 to 200 μm and heights of 1 to 200 μm.

28. The microdroplet/bubble-producing method according to claim 22, wherein the width of the end of the slit is 10 to 500 μm.

29. The microdroplet-producing method according to claim 22, wherein the inner walls of the microflow channels are formed of hydrophobic surfaces, the dispersion phase is an aqueous phase and the continuous phase is an organic phase.

30. The microdroplet-producing method according to claim 22, wherein the inner walls of the microflow channels are formed of hydrophilic surfaces, the dispersion phase is an organic phase and the continuous phase is an aqueous phase.

* * * * *